United States Patent
Bitterly et al.

(10) Patent No.: US 6,695,951 B1
(45) Date of Patent: Feb. 24, 2004

(54) SALINE/SEWAGE WATER RECLAMATION SYSTEM

(76) Inventors: Jack G. Bitterly, 4723 Vista De Oro, Woodland Hills, CA (US) 91364; Steven E. Bitterly, 27032 De Berry Dr., Agoura, CA (US) 91301

(*) Notice: Subject to any disclaimer, the term of this patent is extended or adjusted under 35 U.S.C. 154(b) by 313 days.

(21) Appl. No.: 09/618,337

(22) Filed: Jul. 18, 2000

(51) Int. Cl.$^7$ .............................. B01D 1/28; B01D 3/10
(52) U.S. Cl. ...................... 202/182; 159/6.1; 159/13.2; 159/24.1; 159/26.1; 159/27.3; 159/DIG. 16; 202/202; 202/236; 202/237; 202/238; 202/187
(58) Field of Search ................................ 202/172–174, 202/182, 236, 238, 205, 187, 237, 202; 203/21, 24, 26, 71, 98, 11, 22, 72, 73, 89; 159/601, 602, 24.1, 26.1, DIG. 16, 27.3; 210/294; 494/4

(56) References Cited

U.S. PATENT DOCUMENTS

| | | | |
|---|---|---|---|
| 1,350,009 A | 8/1920 | Del Valle | 494/29 |
| 2,169,601 A | 8/1939 | Cornelius et al. | 122/11 |
| 2,199,848 A | 5/1940 | Bryson | 233/17 |
| 2,199,849 A | 5/1940 | Bryson | 233/17 |
| 2,210,928 A | 8/1940 | Hickman | 202/205 |
| 2,349,431 A | 5/1944 | Hickman | 202/205 |
| 2,474,006 A | 6/1949 | Maycock | 261/83 |
| 2,765,979 A * | 10/1956 | Boestad et al. | 494/1 |
| 2,894,879 A | 7/1959 | Hickman | 202/45 |
| 2,924,292 A | 2/1960 | Hickman | 202/182 |
| 3,136,707 A | 6/1964 | Hickman | 202/236 |
| 3,200,050 A | 8/1965 | Hogan et al. | 202/176 |
| 3,271,271 A | 9/1966 | Watt | 202/173 |
| 3,396,088 A | 8/1968 | Bechard | 202/238 |
| 3,486,984 A | 12/1969 | Sperry | 202/172 |
| 3,559,879 A | 2/1971 | Bechard et al. | 233/11 |
| 3,595,298 A | 7/1971 | Berkeley, III | 159/6 |
| 3,717,554 A | 2/1973 | Ruthrof | 202/238 |
| 3,788,954 A | 1/1974 | Cantrell | 203/89 |
| 3,797,662 A | 3/1974 | Titus | 210/78 |
| 3,890,205 A | 6/1975 | Schnitzer | 202/236 |
| 3,915,673 A | 10/1975 | Tamai et al. | 55/17 |
| 4,030,897 A | 6/1977 | Pelzer et al. | 44/42 |
| 4,052,303 A | 10/1977 | Hultsch et al. | 210/78 |
| 4,249,083 A | 2/1981 | Bitterly | 290/1 |
| 4,451,334 A | 5/1984 | Ciocca et al. | 203/11 |
| 4,586,985 A | 5/1986 | Ciocca et al. | 202/174 |
| 4,863,567 A * | 9/1989 | Raley | 165/88 |

(List continued on next page.)

OTHER PUBLICATIONS

Waste Management Program, Final Report. NASA Report No. 25,158. Final report of technical results on contract NAS 9–1680, 1965.

Primary Examiner—Virginia Manoharan
(74) Attorney, Agent, or Firm—Kleinberg & Lerner LLP

(57) ABSTRACT

The present water reclamation system includes a series of concentric thin shells. The shells mount within a housing that can be maintained under vacuum or low pressure. The shells rotate at high velocity. Contaminated liquid from outside the housing is injected into the space between half the shells. The centrifugal force causes the liquid to form a thin film along the inward facing surface of the shell. A compressor lowers the pressure adjacent the thin film causing the liquid to boil. The compressor carries the vapor to the other side of those shells at a slightly higher temperature. There the vapor encounters the wall, which is cooler because its heat was transferred to boil the contaminated liquid. The vapor condenses, and rotation throws the condensate against the adjacent wall where it is collected. When condensing, the heat of condensation transfers to the shell for boiling the incoming contaminated liquid. The system needs no heat sources other than the energy of vapor compression to complete the cycle flow from vaporization to condensation. Various systems inject contaminated liquid into the device and collect the purified liquid and contaminated sludge.

15 Claims, 29 Drawing Sheets

U.S. PATENT DOCUMENTS

| | | | |
|---|---|---|---|
| 5,409,576 A | 4/1995 | Tleimat | 202/174 |
| 5,411,640 A | 5/1995 | Ramsland | 202/174 |
| 6,123,655 A | 9/2000 | Fell | 494/50 |
| 6,238,524 B1 | 5/2001 | Zebuhr | 202/185.1 |
| 6,258,215 B1 | 7/2001 | Samsonov et al. | 202/176 |
| 6,261,419 B1 | 7/2001 | Zebuhr | 202/172 |

\* cited by examiner

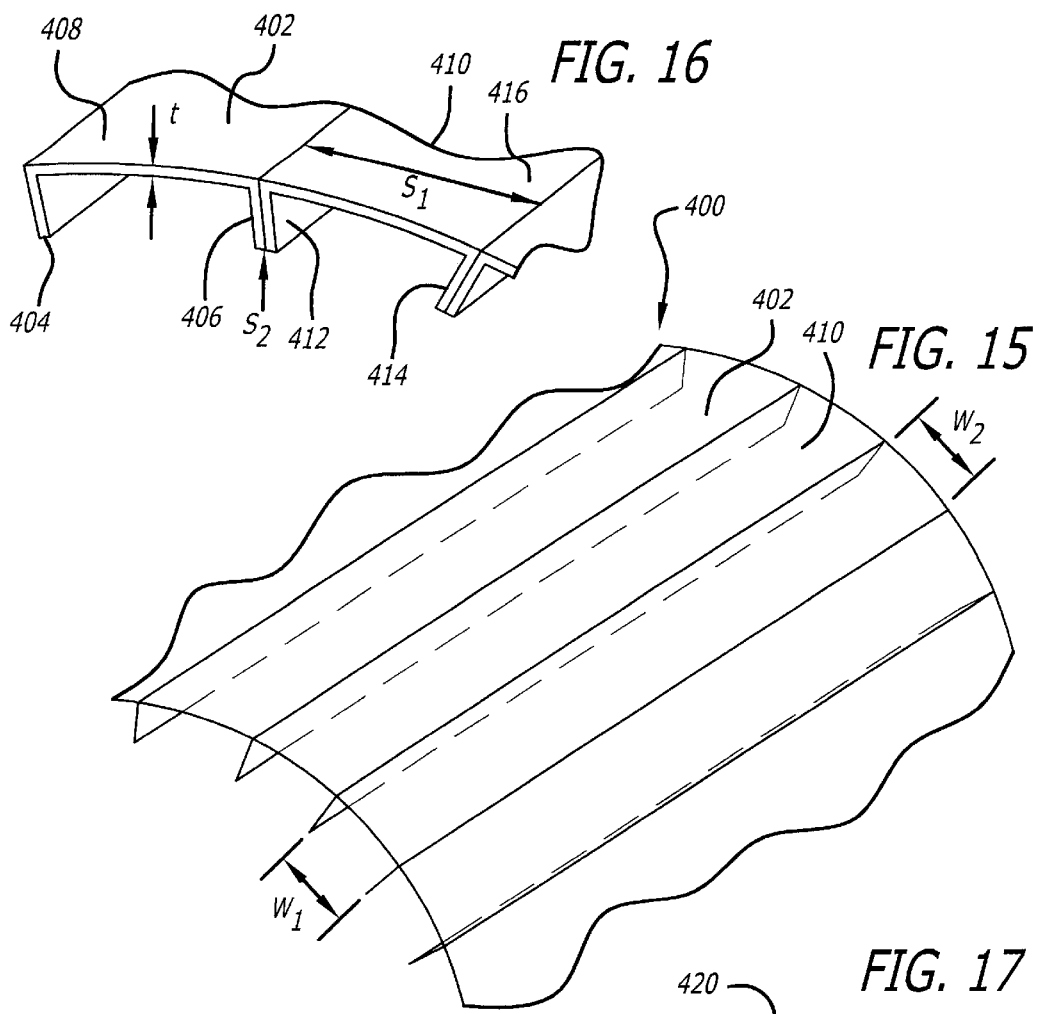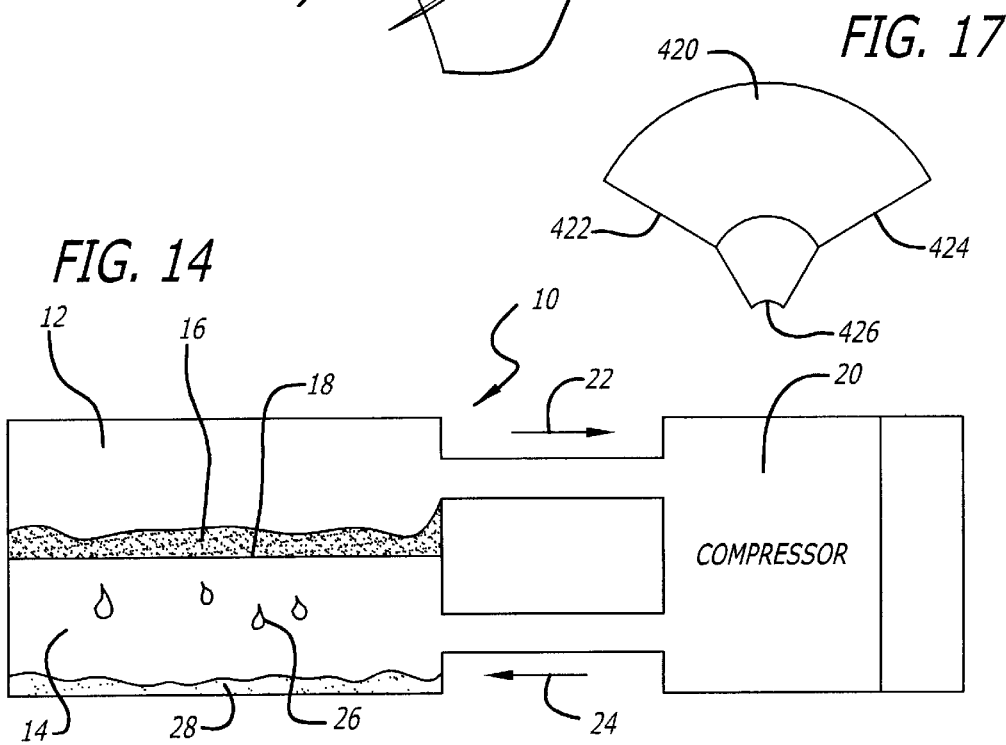

SALINE/SEWAGE WATER RECLAMATION SYSTEM

BACKGROUND OF THE INVENTION

1. Field of the Invention

The present invention relates to a saline and sewage water reclamation system and process using an extremely efficient vapor compression/vacuum distillation cycle. Though the system and process has its greatest use with saltwater or contaminated water, it also can be used to reclaim other fluids or to remove toxic wastes from fluids.

2. State of the Art

Distillation is a common method known to remove unwanted substances from a contaminated water supply or to remove salt from brine. The process occurs by a selective phase change between the differing vapor pressures of the contaminants and the water vapor. Phase change by evaporating water is the process by which rainwater has been recycled continuously since water first appeared on earth. The earth's water bodies are open systems. Consequently, the balance of differing vapor pressures between the water body and the atmosphere and the heat flux from solar radiation acting on the water body affects the amount of evaporation.

Distillation is slow at atmospheric pressures unless the heat flux is raised to the boiling point of water, 212° F. (100° C.) at sea level. (Metric conversions are approximations.) Therefore, to distill water at atmospheric pressures, heat energy must raise the temperature from ambient to 212° F. (100° C.). At that temperature, water boils and vaporizes, changing from liquid to gas. Once the water vaporizes, a cold source must be present to condense liquid water from the water vapor. One must use additional energy to remove heat from a cold trap and create a continuous cold source to condense the fluid.

Boiling contaminated liquid at atmospheric pressures usually has not been economically viable. For desalination or waste management, the temperature change is from about 70° F. to 212° F. (21° C. to 100° C.), a 142° F. (61° C.) temperature difference ($\Delta T$). In colder climates, the temperature difference often is greater. The necessary energy required to heat water to boiling and to maintain condensers cool enough to condense the vapor makes traditional water distillation systems prohibitively expensive to operate without using costly, "multi-effect" boiling chambers. They have found their niche in specialized applications. For example, in desert regions near an ocean or soda lake, for ships and in space applications, one may trade off the high energy cost for the need for potable water. One also may accept the high energy costs where the contaminants are so toxic that they must be removed from the water.

Not only is higher temperature distillation expensive, it can cause an additional problem. When processing contaminated liquids that contain minerals or organic molecules, higher temperature can cause chemical reactions between the molecules. Some reactions can form high molecular weight molecules that can obstruct boiler walls and make cleaning difficult. High temperatures also break down the walls of organic cells within the contaminates, which can release toxic materials into the liquid. High temperature boiling can cause some lower molecular-weight contaminates to vaporize and migrate with the water vapor toward the condenser.

Reverse osmosis (R.O.) systems also are common for saline water reclamation. They also are costly and are not used for large applications.

Despite problems with ambient-pressure distillation and R.O., desalination capicity in the United States has increased. According to the Office of Technology Assessment, in 1955, for example, the United States had almost no capacity, and less than 30 million gallons per day (Mgal/d) (113.5 million liters per day) could be produced in 1970. By 1985, capacity exceeded 200 Mgal/d (757 million liters per day). Still, that amount is quite small compared to the annual water use in the United States. For example, the United States Geological Service reports that overall fresh water withdrawals in the United States in 1995 was 341,000 Mgal/d ($1.29 \times 10^{12}$ liters per day).

Conventional distillation systems use conventional boilers. Boilers are an advanced art whose efficiencies have been studied and documented. See, e.g., McAdams, W. H., *Heat Transmission* 2d Ed., McGraw-Hill 1942, pp.133–137.

Boiler and Condenser Phase Change Processes: The energy required to produce a liquid-to-gas phase change is defined by the heat of vaporization equation given by:

$$Q = w \Delta h_v. \tag{1}$$

Where:

| | |
|---|---|
| $Q$=Heat energy; (BTU) | (1a) |
| $w$=Weight of fluid to be vaporized; (lbs) | (1b) |
| $\Delta h_v$=Heat of Vaporization of the fluid (BTU/lb). | (1c) |

During a continuous feed flow process, the required energy per unit time is simply the time derivative of equation (1) and defined by:

$$\dot{Q} = \dot{w} \Delta h_v \tag{2}$$

| | |
|---|---|
| where, $\dot{Q}$=Heat energy flow; (BTU/hr) | (2a) |
| $\dot{w}$="Mass" (weight) flow of fluid vaporized (lbs/hr). | (2b) |

The heat transfer rate flowing between the boiler and condenser is by a combination of both convective and conductive processes and is given by Newton's Law of Cooling defined by:

$$\dot{Q} = UA\Delta T, \tag{3}$$

| | |
|---|---|
| where, $U$=Overall heat transfer coefficient; (BTU/(ft²hr ° F.)) | (3a) |
| $A$=Overall boiler & condenser area; (ft²) | (3b) |
| $\Delta T = T_C - T_B$=Temperature difference between boiler & condenser (° F.). | (3c) |

One computes the overall heat transfer coefficient by the standard parallel addition of local, individual heat transfers, which yields:

$$\frac{1}{U} = \frac{1}{h_C} + \frac{1}{h_B} + \frac{1}{\left(\frac{k_{wall}}{t_{wall}}\right)}. \tag{4}$$

See, e.g., McAdams, W. H., *Heat Transmission*, 2d Ed., McGraw-Hill 1942, pp. 133–137. This expression has the following definitions:

| | |
|---|---|
| $h_C$=Condenser local heat transfer coefficient; (BTU/(ft²hr ° F.)) | (4a) |
| $h_B$=Boiler local heat transfer coefficient; (BTU/(ft²hr ° F.)) | (4b) |

$k_{wall}, k_{fluid}$=Thermal conductivities of wall and fluid; (BTU/(ft hr ° F.)) (4c)

$t_{wall}, t_{fluid}$=Thickness of the common wall (ft). (4d)

The mass flow, $\dot{w}$, in pounds per hour of purified fluid from the distillation unit can be computed by combining equations (2) and (3) yielding:

$$\dot{w} = \frac{UA\Delta T}{\Delta h_v}. \quad (5)$$

In units of gallons per day, the mass flow, $\dot{W}_G$ equals:

$$\dot{w}_G = C_G \frac{UA\Delta T}{\Delta h_v}. \quad (6)$$

where, $\dot{W}_G$=Mass flow rate; (Gal/day) (6a)

$C_G$=Constant conversion to gal/day=(24/8.3454). (6b)

Quantities in each preceding equation are temperature and pressure dependent. Consequently, the optimum thermodynamic cycle for contaminated water or any other fluid depends on the fluid and contaminants. Most fluids have known properties, however. Accordingly, one can account for the particular fluid. Further, a computer microprocessor feedback and control system can adjust for any specified requirements.

Heat Transfer Performance: Equations (5) and (6) show that a linear increase in the overall heat transfer coefficient U increases the system output flow rate linearly. Increasing the temperature difference requires added energy consumption. The ambient input temperature, which is not controlled, determines the working temperature. Therefore, maximizing the heat transfer coefficient without increasing the working temperature T or the temperature difference ΔT is advantageous.

Thin boiler wall thickness: It is important to utilize a very thin boiler/condenser wall surface thickness $t_{wall}$, with metals that have high heat conductivity $k_{wall}$. Typically, the wall thickness is between 0.010 inches to 0.015 inches (0.25 mm–0.38 mm). The heat conductivity for steel, a typical boiler wall surface, is about 25 BTU/(ft hr ° F.) (0.43 watt/cm-° C.), which yields a boiler wall conductivity heat transfer rate of between 20,000 and 30,000 BTU/(ft²hr ° F.).

Thin Film Boiling: Minimizing the contaminated water fluid film thickness against the boiler surface improves heat transfer to fluid in a boiler. Conventional boilers do not create a uniform thin fluid film against the boiler surface. Consequently, they must rely on high temperature gradients to conduct heat through the fluid film. Thin film boiling normally operates at lower boiling temperature. In the prior art, the thin film of liquid is deposited along the boiler wall in two different ways, wiping or spraying.

By rotating the entire assembly, centripetal "g" loads cause the fluid to form a thin uniform film against the boiler surface. In the present invention, injectors adjust the liquid film thickness in accordance with the boiler rotation rate. Computer feedback logic could maximize the purified output flow rate to the prescribed energy consumption. Applicants recognize that rotation causes centripetal loads. In common parlance, many refer to this load as centrifugal force. Though no centrifugal force exists to act on the liquid, the application still uses the term "centrifugal" to denote forces causing liquid to film on the inside on the boiler shells.

Fluid film thickness values are usually maintained between about 0.020 in to 0.010 in (25mm to 0.51 mm). Conventional boilers do not maintain this small of a film thickness. Consequently, their throughput flow rate is limited to operating regimes at high ΔT temperature differences or large boiler surface areas A because the boiling heat transfer rates are reduced.

High boiler heat transfer Under conditions of relatively low fluid velocities (low Reynolds numbers, Re), convection and phase change processes govern the boiling heat transfer rate. Thin film conditions in the boiler create a condition whereby nucleate boiling can occur at low ΔT, which produces high heat transfer rates. The heat transfer process with phase change is more complicated than the normal liquid phase-only convection process. In liquid-phase convection, one can describe the methodology by including the fluid effects of viscosity, density, thermal conductivity, expansion coefficient, and specific heat along with the geometry of the system. However, the mathematics for heat transfer with a phase change also includes the surface roughness characteristics, the surface tension, the latent heat of evaporation, the pressure, the density and other properties of the liquid-vapor. The entire process becomes so complex that empirical experimental data and dimensional analysis determines the analytical expressions.

The weight of fluid against a boiler surface is a major cause that allows heat transfer to take place. Therefore, artificially increasing the weight of the fluid by subjecting it to a rotating "g" field against a cylindrical surface causes the boiling heat transfer rate to increase.

High condenser heat transfers: In general, the physical processes that occur when pure vapor condenses are complex. The processes involve a coupled transfer of heat and mass in which the latent heat of condensation provides the heat to be transferred, and the vapor and condensate are the transported mass. Condensing heat transfer rates typically are high due to the large latent heat energy contained in the vapor.

When the condensate remains as drops on the condenser surface, the process becomes less efficient. The drops remaining on the surface prevent new vapor from reaching the surface. Therefore, removing drop-wise condensation from the condenser surface increases efficiency. If the condenser surface is cylindrical and faces outward, rotating the condenser at a high g causes the condensate to be thrown off the condenser wall. As the velocity increases, condensate is thrown off the wall more quickly and completely to yield a surface that is ready to receive vapor.

SUMMARY OF THE INVENTION

The principal object of the present invention is to disclose and provide an efficient water reclamation system that can distill brine and other contaminated liquids at low cost. By reducing the system's operating pressure to near the vapor pressure of the contaminated fluid, boiling can occur at ambient temperatures with a small temperature difference (ΔT), e.g., 6° F. (3° C.) or less. By having low temperature boiling occur on one side of a thin boiler wall and condensation occur on the other side of the wall, heat transferred to the wall by the condensing fluid can provide energy for boiling on the opposite side of the wall. Further, constructing the boiler/condenser wall as a cylindrical shell, having the boiling surface face toward the axis of rotation of the cylinder and then rotating the cylinder about the axis, heat transfer for boiling improves due to the higher g forces on the fluid. Likewise, because the condenser surface faces outward, as vapor condenses, the drops of condensate are thrown off the condenser surface. That leaves a clean surface to receive vapor, which improves condenser efficiency. Because of the high heat transfer capabilities possible from a rotating boiler/condenser, boiling can occur practically at ambient temperatures. Low temperature boiling minimizes scale and fouling of the boiling wall surface. This allows the boiling heat transfer rate to be maintained at a very high level.

One object of the present invention is to maintain fluid film thickness values between about 0.020 in. to 0.010 in. (0.51 mm–0.25 mm). The thin film under accelerated g rotation improves boiling heat transfer rate to several thousand BTU/(ft$^2$ hr ° F.).

Another object of the present invention is to disclose and provide a water reclamation system that processes large volumes of fluid in a small system volume. By arranging the cylindrical shells concentrically, the system of the present invention can accomplish that object.

Another object of the present invention is to design the system to work continuously instead of in batch mode. Thus, contaminated fluid enters the system, and clean water or other purified fluid exits the system and are collected continuously. Likewise, the salts or other contaminates also exit the system continuously and are collected separately.

Some or much of the contaminated fluid likely will not vaporize. Thus, the system may not convert 100% of incoming brine, for example, to potable water. As the percentage converted increases, the boiling point rise increases, and the energy requirements of the system increase. This occurs because as the salinity concentration increases a greater temperature increase is required to boil the remaining fluid. Brine from seawater is inexpensive, and returning brine back to the ocean at slightly higher salt concentrations usually is acceptable. Accordingly, an object of the present invention is to allow it to keep the percentage of brine converted well below 100%, use less energy and be very economical. On the other hand, where the system is removing toxic wastes which must be stored or disposed, limiting the volume of the output (i.e., limiting the amount of fluid that remains with the contaminate) probably is desirable. Therefore, these systems may process and vaporize a higher percentage of these contaminated fluids. Accordingly, another object of the present invention is to design a system that can process different types of fluid from brine to highly toxic waste.

Another object of the present invention is to disclose and provide a construction for the present invention in which the various parts can be constructed at relatively low cost. The present invention uses concentric cylindrical or tapered shells. One object of the present invention is to provide low-cost methods for constructing the shells, including providing shells of different diameters.

Another object of the present invention is to use an efficient compressor for raising the temperature and pressure on water vapor slightly and directing the vapor to the condensing surfaces.

Another object of the present invention is to disclose a process that requires lower power than other systems.

Another object of the present invention is to provide water or other fluid reclamation that can be fully automatic, uses no expendable materials during fluid processing and has a long operational life with minimum maintenance.

To accomplish these objects, the present water reclamation system comprises a series of concentric thin shells. The shells mount within a housing that can be maintained under vacuum. Two adjacent shells form a boiling space, and one of those shells and the next adjacent shell form a condensing space. Thus, the boiler and condenser share a common wall. The shells also rotate together within the housing.

One end of each boiling space is open to a compressor, which raises the pressure and adds heat to the water vapor after the water boils. As fluid boils, the compressor transfers the vapor to the condensing spaces, which are open to the downstream side of the compressor. The vapor strikes the condenser wall, which is a wall that is common to the adjacent boiling space. The vapor condenses and transfers heat to the wall or shell. That heat energy boils new, incoming liquid. This minimizes the heat energy that the system uses. In other words, the latent heat of condensation in the condenser is transferred and then used as the latent heat of vaporization in the boiler. The system needs no heat sources other than the energy of vapor compression to complete the cycle flow from vaporization to condensation.

The boiling surfaces of the shells face the axis of rotation. Therefore, any liquid on the boiling surface receives added g forces. By controlling the fluid flow onto the boiling surface, the system also can maintain the fluid as a thin film. Thin film boiling and added g forces increase the heat transfer rate.

Because the condenser surfaces face outward, when vapor strikes the surface and condenses, it immediately is thrown off the surface. This leaves a clean surface on which new vapor condenses. High g forces cause the condensate, now a pure liquid, to collect as a film along the outer shell of the condenser space. Tapering the shells causes the condensate to flow toward the larger diameter end of the shell where it is collected.

As the liquid boils in the boiler, the high g forces maintain the contaminates on the boiler wall. The system's construction prevents the contaminates from flowing back toward the inlet. High g forces also cause the contaminates to flow along the boiler wall. When they reach the end of the wall, they are thrown outward and collected in a ring. From the ring, the contaminates are pumped or otherwise directed out of the housing. To keep the sludge and pure liquid separate, collection of contaminates and pure liquid can occur at opposite ends of the shells.

The system can deliver ultra pure water or other liquids, and it can be used for toxic waste clean-up applications. There, the system fractionally separates all kinds of liquid contaminates including nitrate polluted wells, cyanide polluted mines, petroleum polluted water tables and even radioactive contaminants contained in water. In industrial applications, textile factories could separate their contaminated dyes and solutions from water, plating industries could separate their metals and chemicals from water used in their plating troughs, and electronic industries could separate the toxic chemicals from solutions used during their manufacturing process. All these applications can be handled with the same processing technology functioning under different but specific operating conditions.

These and other objects are evident from the description of the exemplary embodiment of the invention.

BRIEF DESCRIPTION OF THE DRAWINGS

FIG. 6 shows the pure water collection tubes in the foreground and the waste input tubes in the background. The fan/compressor is not in this figure. FIG. 7 is the same view as FIG. 6, but the fan and the housing is visible. In FIG. 8, the vacuum chamber housing also is visible.

FIG. 14 is a block diagram schematic of the process that the present invention used for desalination or decontamination showing a common boiler/condenser wall.

FIG. 15 is a perspective view of part of a shall for another embodiment of the present invention.

FIG. 16 is a detailed view of part of FIG. 15.

FIG. 17 is a template that can be used for forming shells for the present invention.

DETAILED DESCRIPTIONS OF THE EXEMPLARY EMBODIMENTS

Figure 1:
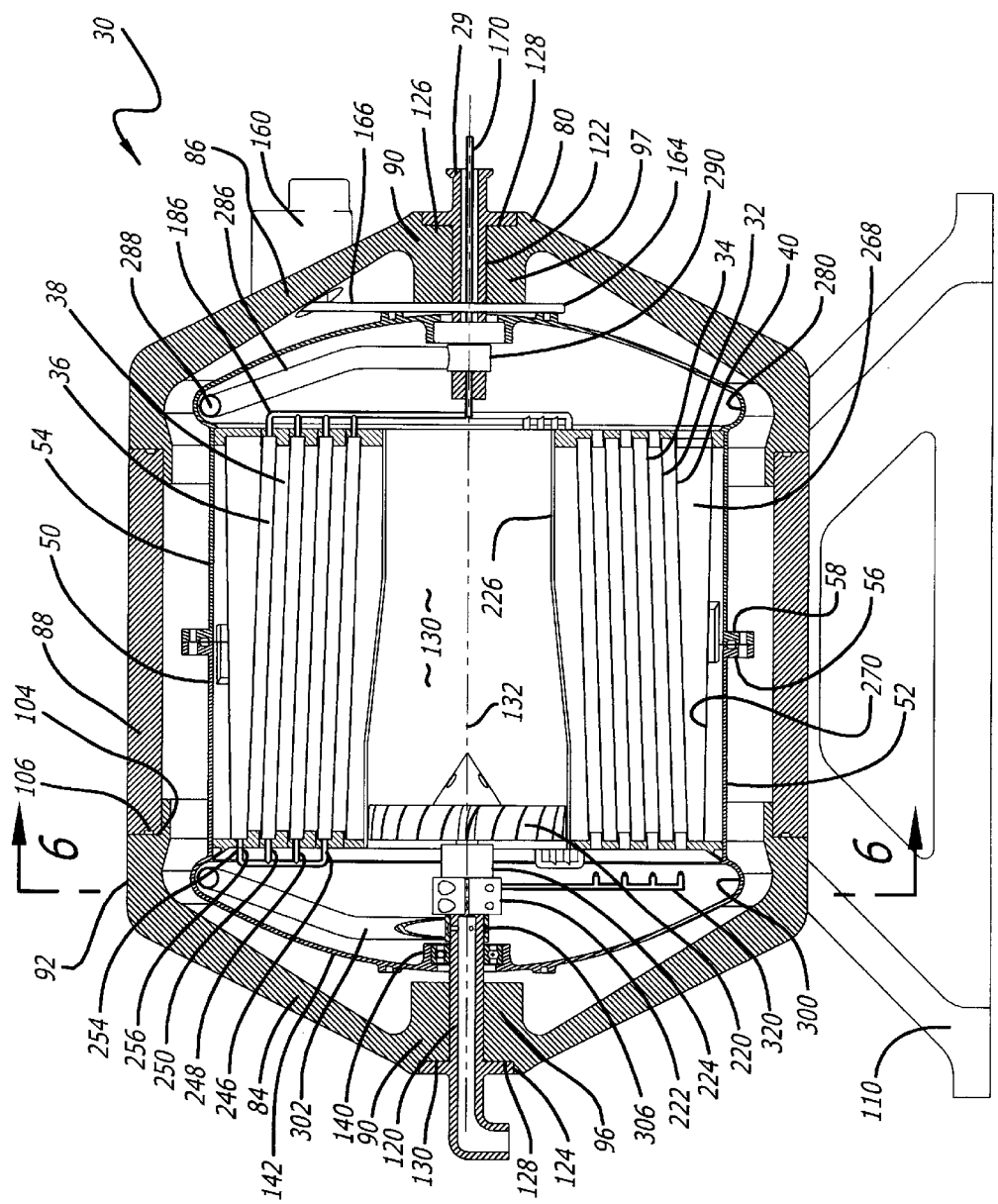
FIG. 1 is a side sectional view of an exemplary embodiment of the water reclamation system of the present invention.

The water reclamation system 10 of the present invention uses low-pressure boiling and condensation, which FIG. 14 shows in simplified form. The system is conventional. It has an evaporator or boiler 12 and a condenser 14. Both mount in a vacuum chamber (not shown in FIG. 14) so that the contents in the boiler and the condenser are under vacuum. Contaminated liquid or brine 16 is fed into the boiler chamber where it pools on common boiler/condenser wall 18. This application uses the terms "contaminated liquid" or "brine" interchangeably.

The compressor 20 connects to the boiler 12 to decrease the pressure within the boiler. By proper adjustments of the internal vacuum and the pressure decrease that compressor 20 creates, the liquid 16 boils and evaporates. The compressor draws the resulting vapor in the direction of arrow 22. As the vapor is compressed in the compressor, its temperature increases.

The heated vapor continues in the direction of arrow 24. As the vapor enters condenser 14, it contacts common wall 18 and condenses into droplets 26. The droplets fall into pool of pure liquid 28. The condensing vapor transfers energy to the common wall. The energy from the latent heat of condensation in the condenser 14 acts as the energy source that supplies the latent heat of vaporization in the boiler 12.

Two major structures enhance output significantly in the present invention:
 having the common wall 18 be a cylindrical shell and mounting spaced concentric shells within a given volume; and
 rotating the shells at high rotational velocities to subject the contaminated and processed water to high g forces.

FIG. 1, which shows an exemplary embodiment of the boiler/condenser subassembly and its constituent parts, illustrates both structures.

Rotating Boiler and Condenser. Applicants believe that the system of the present invention may be about 20 in. (50 cm) in diameter to 5 ft. (1.5 m) or more. The first embodiment is the smaller system.

The reclamation system 30 of the present invention comprises an inner housing 50 that mounts within a vacuum chamber 80 (FIG. 1). The diameter of the inner housing 50 of the exemplary embodiment is about 14.1 in. (3.6 cm). The entire system may be scaled up or down, however. As is explained in more detail, the system 30 comprises a series of concentric metal shells. In the exemplary embodiment, the shells are stainless steel, aluminum or other metal although some plastics may be acceptable. Metals have better heat transfer capabilities, but plastics are less expensive to fabricate.

The exemplary embodiment of FIG. 1 has four shell sub-assemblies, and each sub-assembly comprises two shells. Only three of the shells are discussed initially—outer shell 40, intermediate shell 32, which is within the outer shell 40, and inner shell 34, which is within the intermediate shell. FIGS. 1–4 and 10. "Inner," "intermediate" and "outer" are relative terms and represent three adjacent shells in the inner housing 50.

The space between the outer shell 40 and the intermediate shell 32 is a boiling or vapor chamber 38. Similarly, the space between the intermediate shell 32 and the inner shell 34 is a condenser chamber 36. In this embodiment, the height of each chamber is 0.395 in. (10 mm).

The shells mount within the inner housing 50 (FIGS. 1–4). Though the inner housing can be metal, it is a rigid plastic such as Lexan® in the exemplary embodiment. The inner housing is formed of two housing halves 52 and 54 that attach together along annuluses 56 and 58. The assembly also can be split at locations 280 and 300, each location having appropriate fastening Adhesive, welding, bolts or other fasteners secure the annuluses together. The connection should be secure and air tight because the inside of the inner housing 50 is at a different pressure than outside the housing 50. The diameter of the inner housing in this exemplary embodiment is approximately 14.2 in. (36 cm), and its length is about 11.5 in. (29.2 cm). These dimensions will change if the system is scaled up or down. The inner housing halves are preferably identical to decrease the fabrication costs.

The shells 32, 34 and 40 are formed of a high heat conductivity metal such as stainless steel. Stainless steel also is strong, relatively low cost and is not corroded by salts or contaminants. Anodized aluminum also is a possible choice for the material. It weighs less than stainless steel and has better heat conductivity. It is weaker, however, and more corrosive. Though other metals possible, some are too weak, more expensive, not good conductors of heat or not corrosion resistant. The size of the unit may be a factor in material choice.

This application gives special attention to the inner and outer surfaces of shell of the shells (e.g., shell 32) to provide near ideal boiling and condensing. Boiling surfaces in particular may be treated with special surface coatings and these have been examined for their applicability to this invention. For reasons that are discussed below, the shell material may have grooves scratched into the surface. A non-wettable coating of a plastic material such as Teflon® may enhance boiling or condensation.

The inner housing 50 mounts for rotation within outer housing or vacuum chamber 80. A substantial pressure force exists between the internal vacuum in chamber 80 and the external ambient pressure. Therefore, the walls 82 of the vacuum chamber must be thick enough to resist crushing from those pressure forces outside the chamber. The wall thickness is calculated using known relationships with adequate safety factors and must be thicker for larger-diameter chambers. To save weight and material, the outer wall 82 may be "pocketed" similar to an egg container. Other strengthening techniques also may be used.

Figure 11:
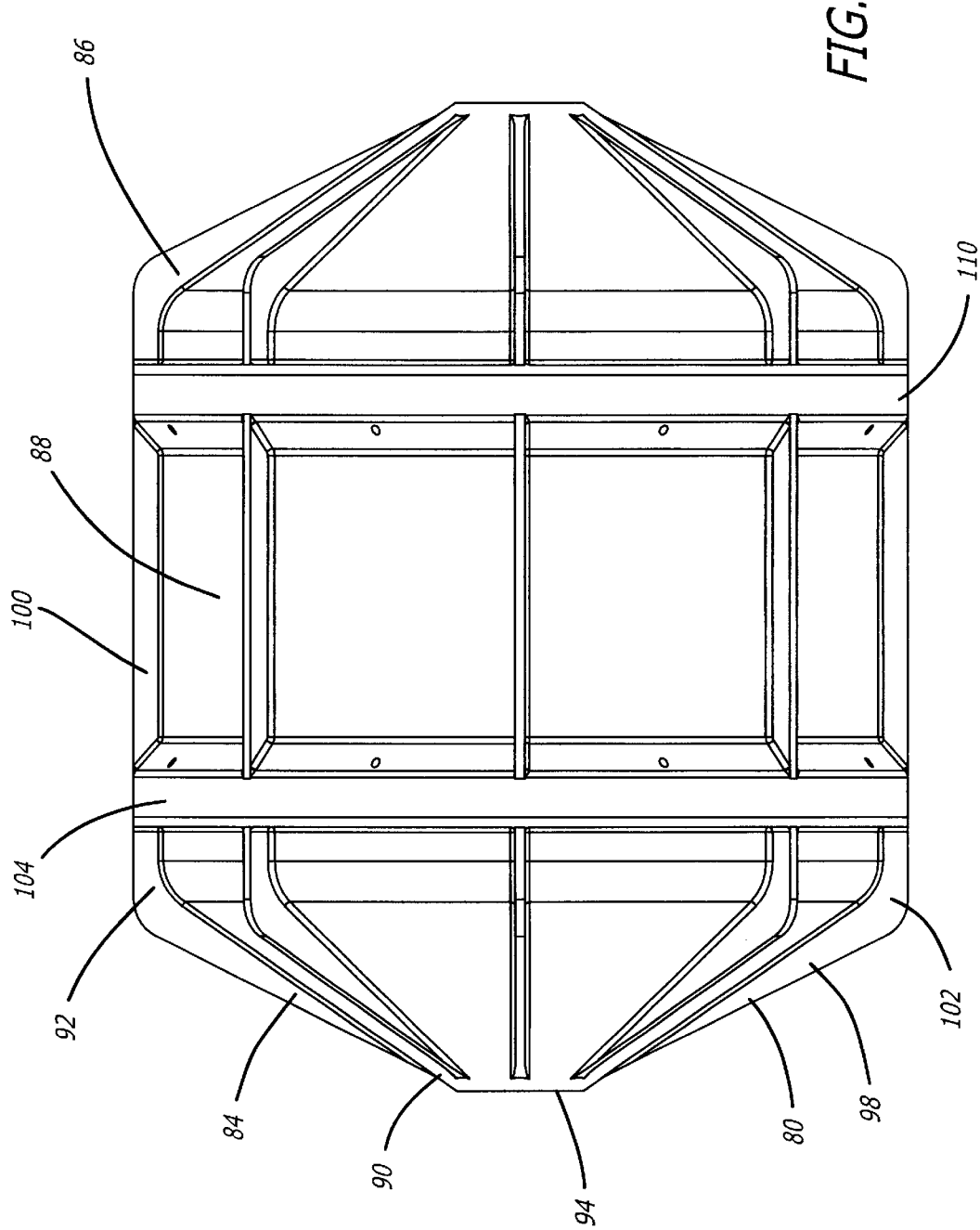
FIG. 11 is a side view of an exemplary embodiment of the water reclamation system of the present invention in which the system operates in the horizontal mode.

A pair of end caps 84 and 86 and a center cylindrical section 88 form outer vacuum chamber 80 (FIGS. 1–4 and 11). The outside diameter is approximately 19.7 in (50 cm). Again, the end caps and the cylindrical section may be metal, but they are a rigid plastic such as Lexan® in the exemplary embodiment. Plastic is strong enough to resist the load on the small diameter system that FIG. 1 shows. Larger vacuum chambers may require metal construction or be wound fiber composite. Each end cap has a frusto-conical portion 90 that curves into a narrow cylindrical portion 92 (FIGS. 1 and 11). The flat end 92 allows parts to be attached to each end cap as FIG. 1 shows. Those parts are discussed below. The end-to-end distance between the outside of each end cap is about 25.6 in (65.0 cm).

The system my uses axial fences fastened to the boiler or condenser surfaces to control the filming or otherwise control the fluid. See FIGS. 15 and 16 for an alternative shell construction that has a form of a fence.

Inward facing hubs 96 and 97 (FIGS. 1–4) are at the center of each end cap. The end caps also have spaced external strengthening ribs 98 (FIGS. 2–4 and 11). In the exemplary embodiment, the end caps are identical so that a single end cap can be used on either side of the vacuum chamber.

The cylindrical section 88 of the vacuum chamber 80 could be molded plastic, wound fiber composite or metal. Strengthening ribs 100 face outward from the cylindrical section (FIG. 11). Annular rings 102 on the end caps 84 and 86 connect to the annular rings 104 on the cylindrical section 88. Bolts 106 through the annular rings secure the cylindrical section to the end caps, but other fastening is possible. The exemplary embodiment uses bolts because they can be removed for access into the chamber. The end caps 84 and 86 also have an annular tongue 104 that seats in an annular groove 106 on the cylindrical section. The tongue and groove align the end caps to the cylindrical section and help create a better seal. An o-ring (not shown) between the tongue and groove assures the vacuum seal. Because the inside of chamber 80 is at near-vacuum pressure, ambient pressure tends to push the end caps against the cylindrical section.

Figure 12:
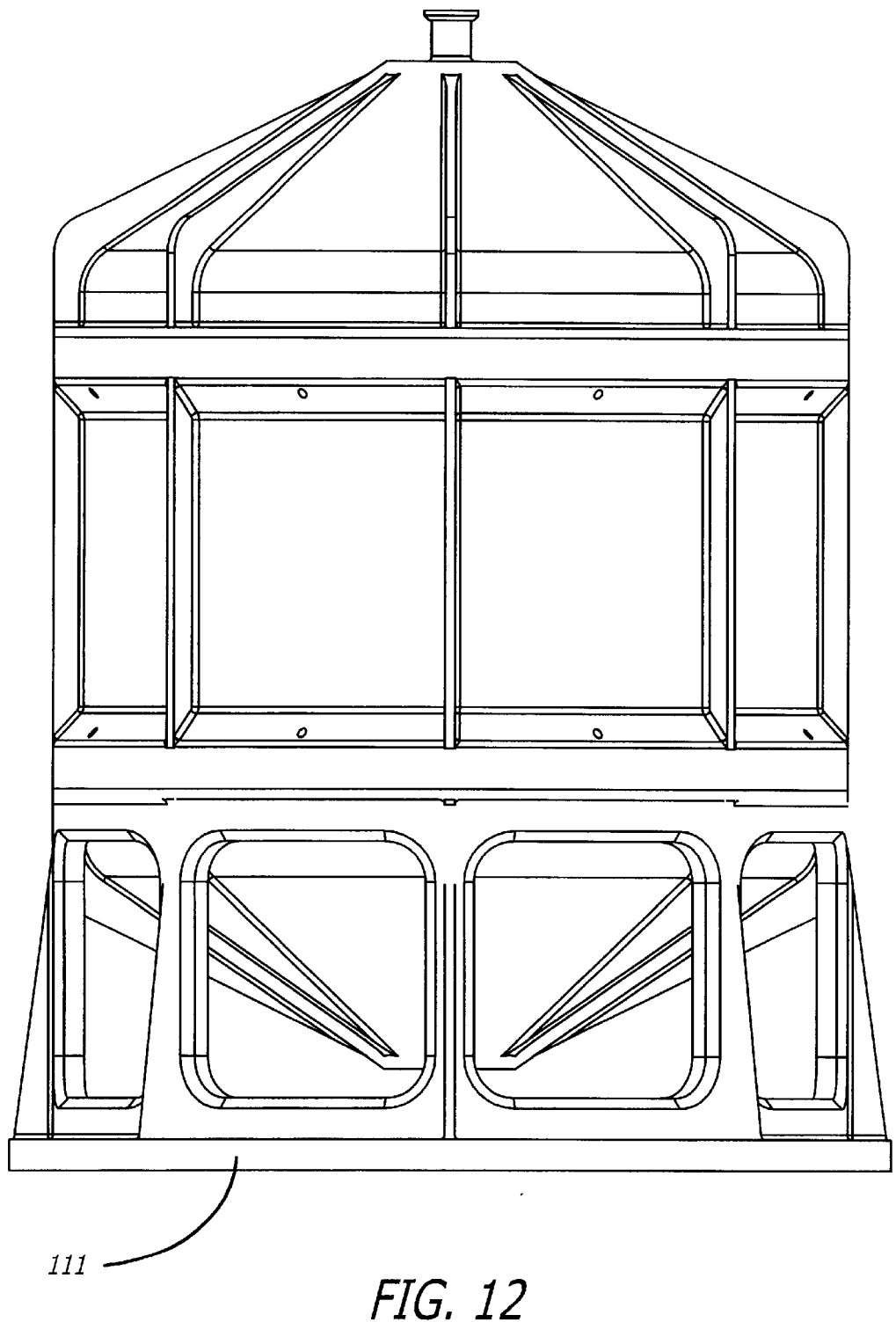
FIG. 12 is another side view of an exemplary embodiment of the water reclamation system of the present invention. In the view, the system is mounted vertically and on a stand.

A stand 110 may support the system 30 off the ground. In FIG. 1, the stand supports the system in a horizontal orientation. In FIG. 12, a different stand 111 mounts the system vertically. The design of the system permits horizontal or vertical mounting desired by system applications. See also the array of vertically mounted systems in FIG. 13, which is discussed below.

Figure 10:
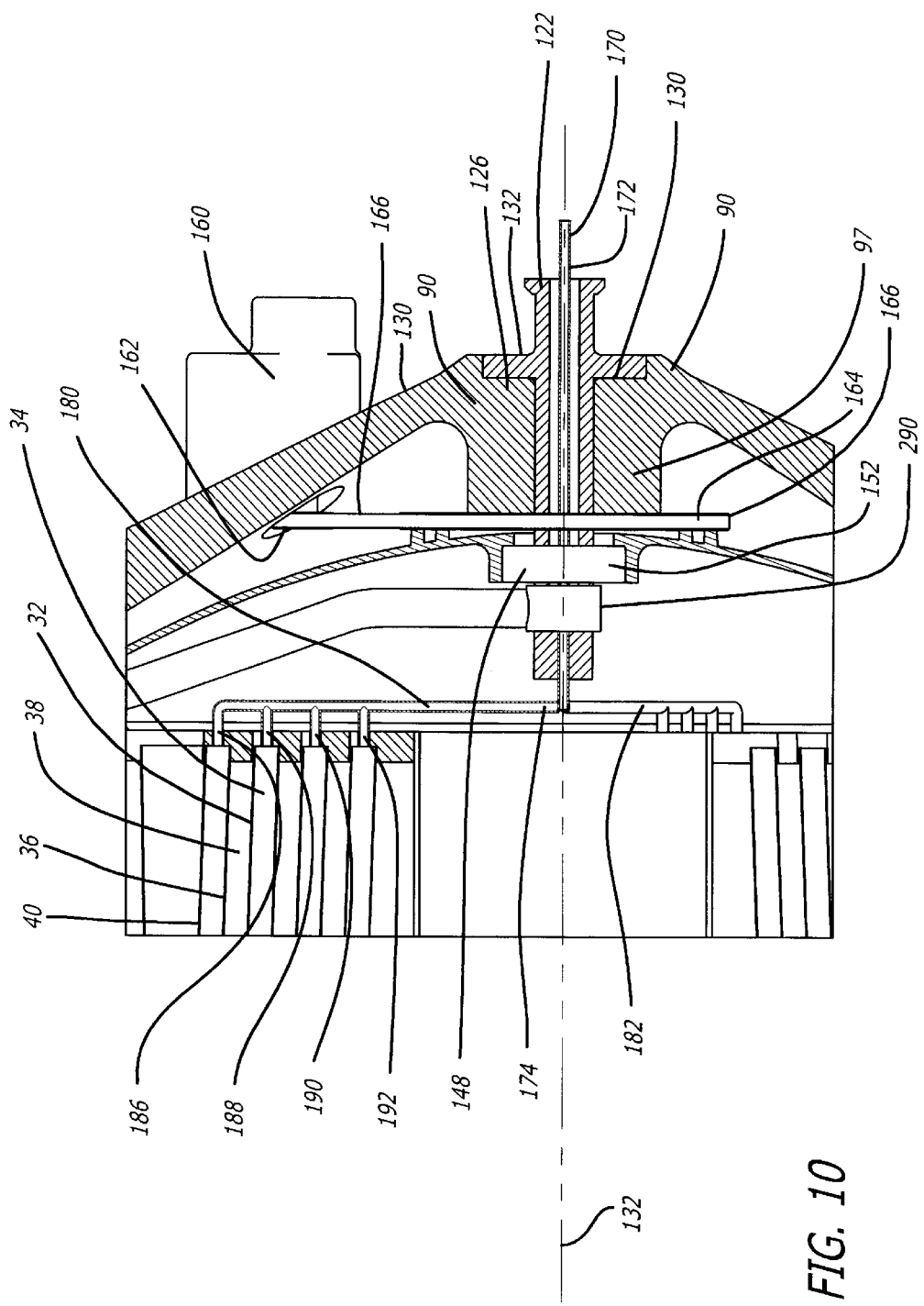
FIG. 10 is a detailed sectional view of the brine or sewage input end of an exemplary embodiment of the present invention and shows the rotating boiler.

The inner housing 50 mounts for rotation within the chamber 80 about an axis of rotation 132. In the exemplary embodiment, hollow shafts 120 and 122 extend through the respective hubs 96 and 97 of end caps 90 along the axis of rotation. The shafts are hollow because they carry fluid as discussed below. Each shaft has a flange 124 and 126 that is secured in respective recess 128 and 130 (FIGS. 1 and 10). Because the shafts support the inner housing 50 for high speed rotation, they must be strong, precision parts, and maintaining tolerances for mounting them in the hubs 96 and 97 of chamber 80 also is important (FIG. 10).

Figure 9:
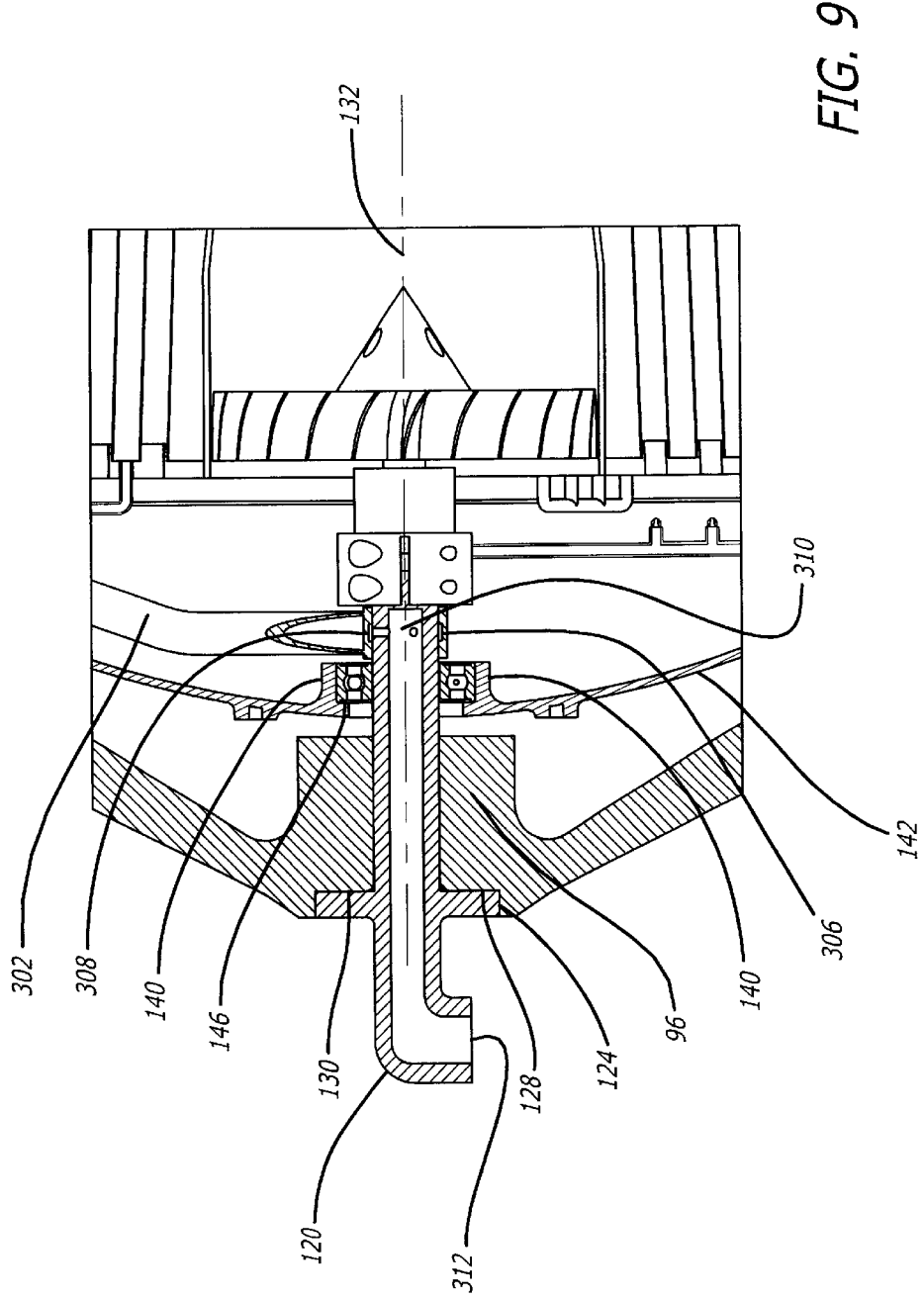
FIG. 9 is a detailed sectional view of the processed waste end of an exemplary embodiment of the present invention

Shaft 120 on the left side (FIG. 1) of the system extends into hub 140 on the end 142 of inner housing half 52 as best shown in FIG. 9. A bearing 146 permits rotation of the hub 140 (and the inner housing 50) about the axis of rotation 132. Similarly, as best shown in FIG. 10, shaft 122 on the right side of the system extends into inner housing hub 148. A bearing 152 permits rotation of the hub 148 about the axis of rotation. Bearings 146 (FIG. 9) and 152 (FIG. 10) are ball bearings in the exemplary embodiment, but those skilled in the art may substitute other bearings such as magnetic bearings. Any bearings should be long-lived and have no corrosion. The size and weight of the system and the rotational velocity of the inner housing 50 will influence the choice of bearings.

A motor 160 rotates the inner housing 50 by belt, chain or gear drive (FIG. 1) in the exemplary embodiment, The motor mounts on the outside of the right-side end cap 90. As FIG. 10 also shows, the motor extends inside the outer housing 80. Both end caps 90 have structure 168 (FIG. 4) for mounting the motor so that the end caps can be identical to save on fabrication costs. However, the system uses only one motor 160, and it mounts on the right-side end cap.

Applicants contemplate that a very small motor will supply all the rotational energy to rotate the inner housing. Such a motor uses only about 25 watts of continual power. The size of the motor will vary with the size of the system and the number of shells, however. An electric motor is very efficient and is easily controlled with standard motor controllers. Where electric power is not available from a utility, the system could use power from a generator Electricity from solar panels can be used and would provide renewable energy for the entire water reclamation system.

Figure 4:
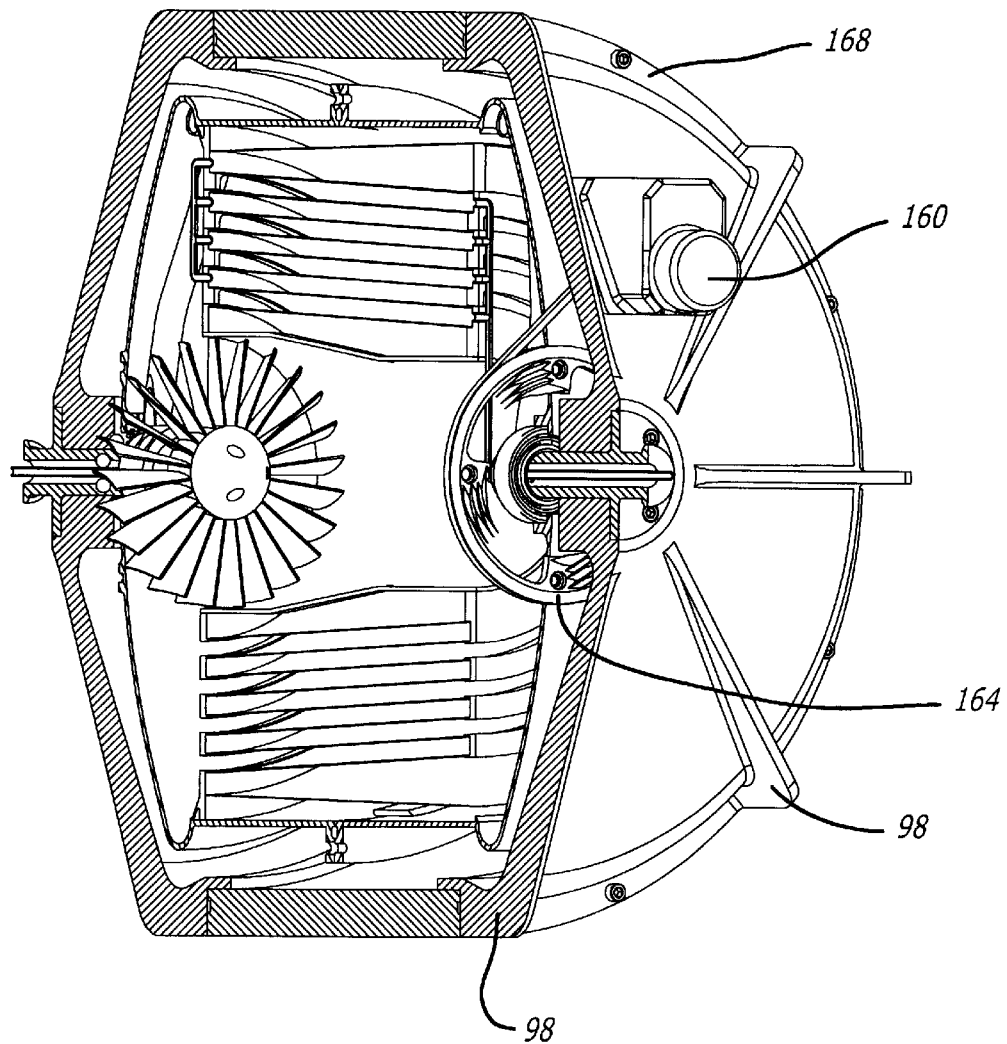

In the belt driven system of the exemplary embodiment, the motor 160 drives a pulley 162, which drives a belt 166. The belt, in turn, drives a pulley 164 around the hub 122 on the right side of the inner housing 50. FIGS. 1, 4 and 10. Applicants use a belt drive for its simplicity and because it minimizes vibrations. A direct, chain, gear or other drive also could be used. The output speed of the motor and the relative diameters of pulleys 162 and 164 affect the rotational velocity of the inner housing 50. Applicants anticipate that for a small system such as that shown in FIG.1 and other related figures (e.g., about 350 gal/day), the inner housing should rotate at about 1,000 rpm, which generates g-forces on the outer-most shell of roughly 500 g's.

Fluid and Mass Flow: Contaminated fluid enters the system from the right side (FIG. 1) through inlet tube 170. (FIGS. 1 and 10). The inlet tube is within shaft 122. The upstream end 172 of inlet tube 170 is stationary and connects to a source of brine or other contaminated liquid. The downstream end 174 of the tube, however, rotates with the rotation of the inner housing 50. Therefore, a seal (not shown) is necessary between the upstream and downstream ends of the inlet tube 170. The seal can be outside the vacuum chamber 80, inside the hub 97 of the chamber or inside the chamber.

The downstream end 174 of the inlet tube terminates into several branches. The exemplary embodiment has three such branches 180, 182 and 184. See FIG. 5, in particular. The number of branches may vary depending on the angular velocity, the size of the shell housing and the number of shells. Each branch has several injectors—four 186, 188, 190 and 192 in the exemplary embodiment for each branch. See FIG. 5. The exemplary embodiment uses four injectors per branch because each injector aligns with one of the boiling or vapor chambers such as chamber 38 (FIG. 1). The exemplary embodiment has four such chambers.

Contaminated liquid flows from the inlet tube, through a seal, into the branches 180, 182 and 184 and then through the injectors 186, 188, 190 and 192 and into the boiling chambers, e.g., chamber 38. The high velocity rotation of the branches creates a head of pressure on the contaminated liquid that varies with the injectors' distance from the axis of rotation 132. Consequently, each injector may have a flow restrictor or nozzle to compensate for the pressure differences. On the other hand, when the contaminated liquid is injected into the boiling chamber, the centrifugal force from rotation creates a thin film of contaminated liquid along the inside of the shell 40. Because the area of the inward-facing wall farther from the axis of rotation is greater than the area of a similar wall closer to the axis, the farther wall requires more contaminated liquid to yield the same thin film thickness. Fluid viscosity also affects flow rates. The nozzles or other flow controls can be adjustable under computer feedback control to account for changing conditions.

Because the contaminated liquid is at low pressure, energy from the shell wall causes the liquid to boils at the low temperature. As discussed previously, the thin film and high centrifugal forces enhance boiling. Some of the contaminated liquid becomes vapor. This vapor is pure, uncontaminated gaseous molecules. In conventional boilers, some contaminates vaporize or are mechanically thrown off as solids and become part of the distillate. The g forces acting on the contaminates in the present invention prevent the heavier molecules to vaporize or leave the film of contaminated liquid. Consequently, the condensed water is purer than one could obtain with conventional boilers and condensers and likely will not contain bacteria, viruses, organic molecules or metals. The system should develop sufficient g forces; therefore, viruses should not exit with the water vapor.

Some contaminated liquid does not vaporize. Consequently, it becomes more concentrated with contaminants. The high-g centrifugal force maintains this sludge or concentrated contaminated liquid as a thin film on the inside surface of wall 40.

Before following the sludge, the flow of vapor is discussed. Annular walls 200, 202, 204 and 206 (FIG. 5) close the upstream end of the boiling chambers such as chamber 36 (FIG. 2). The injectors 186, 188, 190 and 192 (FIG. 5) pass through the annular walls, but the walls block the flow of contaminated liquid, sludge or vapor back to the upstream side of the boiling chambers. Thus, the contaminated liquid, sludge and vapor move to the left in FIG. 1.

After the vapor exits the downstream side of the boiling chambers (left side in FIG. 1), e.g., chamber 38, a compressor fan 220 draws the vapor. Chamber 38 is at or below 0.1 atmosphere, or close to near vacuum because of the very low pressure in outer vacuum chamber 80. Fan 220 also lowers the pressure within the boiling chamber.

The fan lies along the axis of rotation 132 of the shell housing 50. A small electric motor 222 rotates a shaft 224, which connects to and rotates the fan. FIGS. 1–4. In the exemplary embodiment, the fan has a single stage, but it could have multiple stages consisting of a series of fan blades. The fan rotates in a direction counter to the rotation of the shells. Therefore, torque from the fan aids shell rotation through conservation of angular momentum. In the exemplary embodiment, applicants believe that a small wattage motor 222 is sufficient to drive the fan 220. Gearing may be provided between the motor and the shaft 224. The size of the fan and the motor is chosen to provide the amount of compression for the system and the contaminated liquid being processed.

The vapor exits the fan 220 and enters a duct 226 behind the fan (FIGS. 1–4). The shape of the duct will yield a desired pressure at the fan exit to achieve chosen pressure ratios. In the exemplary embodiment, the diameter of the inlet to the duct at the fan is 5.6 in (14.2 cm) and the diameter at the outlet is 4.8 in (12.2 cm), a 1:0.73 ratio. The operating conditions including the ambient temperature and actual contaminated liquid affect these ratios. Any adjustments should act within the fan's efficiency goals.

Returning to the description of the boiler and condenser process, the fan slightly compresses the vapor from the boiling surfaces, which causes adiabatic heating of the vapor. The amount of heating should be less than 6° F. (3° C.). The slightly heated vapor then flows out the right side of duct 226 (FIG. 1) and into the condensing chambers such as chamber 38. There, the vapor encounters the outside surface of shell 32. When the contaminated liquid boils on the inner surface of shell 32, heat energy from the shell transfers to the contaminated liquid. Accordingly, the shell wall cools. When the slightly pressurized and warmer vapor strikes the cool shell wall, it condenses.

The high g forces throw the condensed liquid immediately off wall 34 and against wall 32. In fact, the high g forces throw off even the smallest drops of condensate. Consequently, the condensing surface retains no condensate to interfere with continued condensation. The vapor, therefore, encounters only a "clean" condensing surface, which greatly improves condensation.

This condensate pools along the outer shells of the condensing chambers, such as shell 32 of chamber 38. Centrifugal force urges the pure water into a thin film. Blocked from moving to the right by walls such as wall 200, the pure water flows toward the left ends (FIG. 1) of the shells. Thus, in the FIG. 1 embodiment, the pure water collects on the left side of the condensing shells such as shell 38. The sludge also moves to the left side but of the boiling shell such as shell 36.

Figure 6:
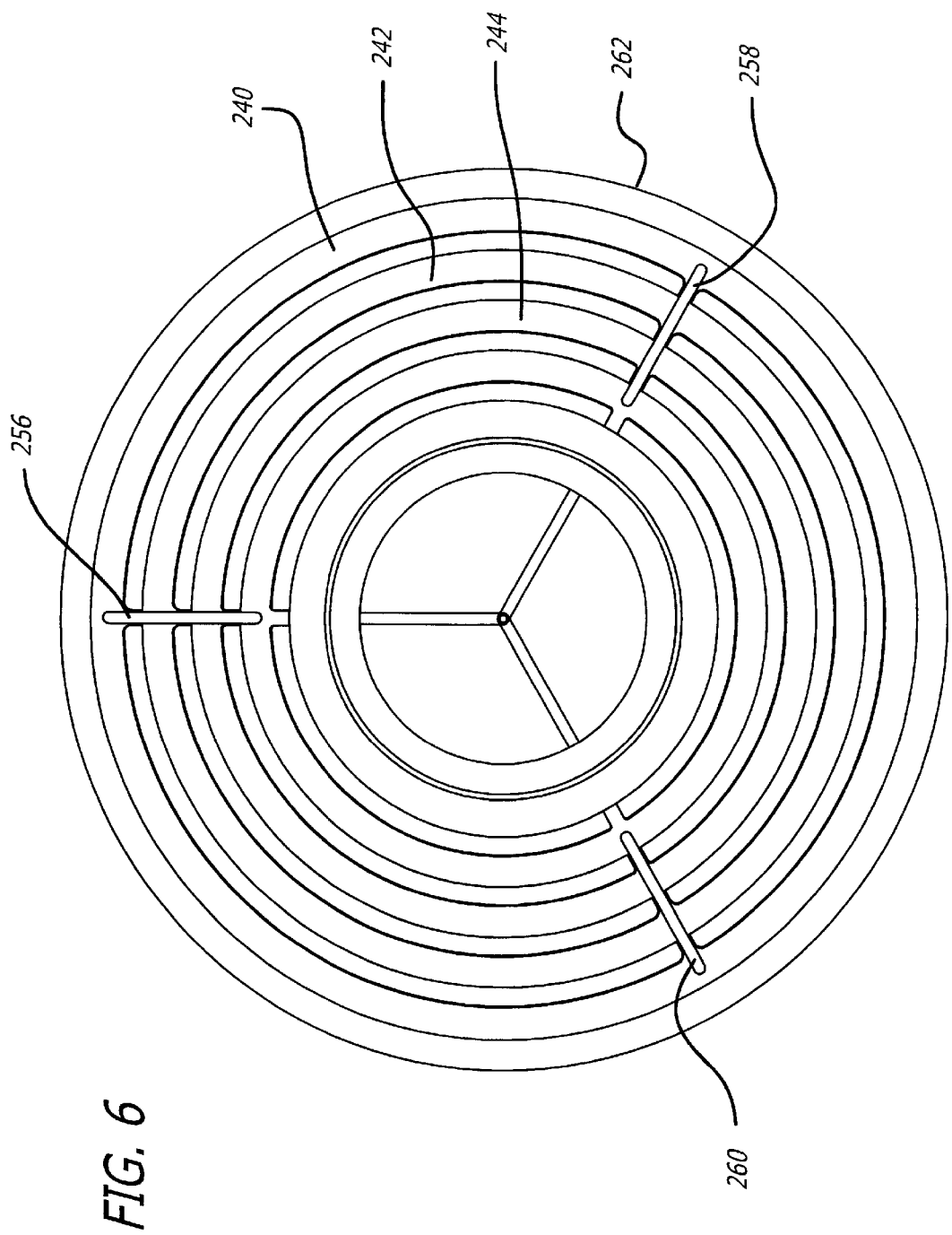
FIGS. 6, 7 and 8 are sectional views of the rotating boiler/condenser taken respectively along plane 6—6 of FIG. 1.
Figure 7:
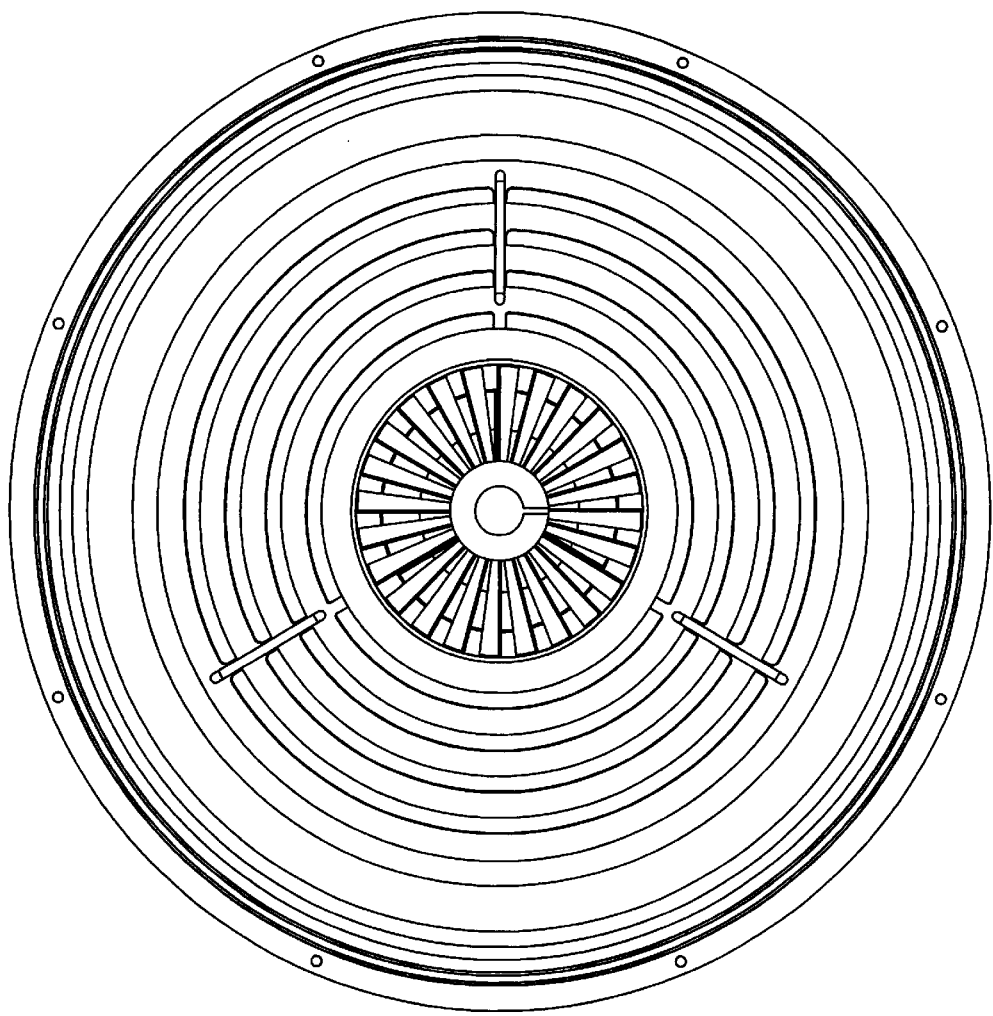
Figure 8:
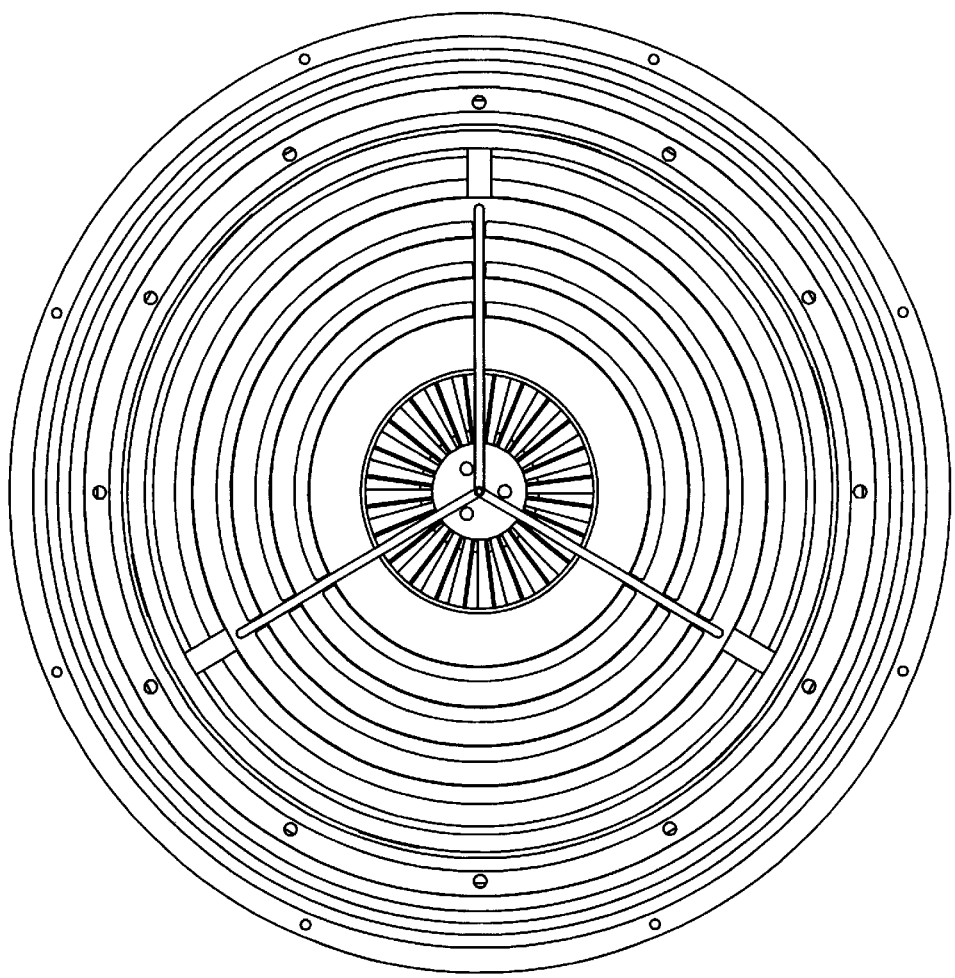

There are many ways to collect the condensate, and this application discusses several. Turning first to the exemplary embodiment of FIG. 1 and as seen in FIGS. 1–4 and 6, as condensate flows to the left (FIG. 1) it reaches a wall 240, 242 or 244 (FIG. 6). Each wall has an outlet tube 246, 248 and 250 (FIG. 1) extending through the wall from the condensing chamber to a collector tube 256. The exemplary embodiment has three sets of these collector tubes 256, 258 and 260 (FIG. 6). As FIG. 1 shows, the pure water from outlet tubes 246, 248 and 250 reaches the collector tube. Centrifugal force from the rotating inner housing forces the pure water to tube 254 (FIG. 1). That tube passes through wall 262 (FIG. 6). Pressure from the centrifugal force in collector tubes 256, 258 and 260 forces the pure water through tube 254 and into collector chamber 268.

Figure 5:
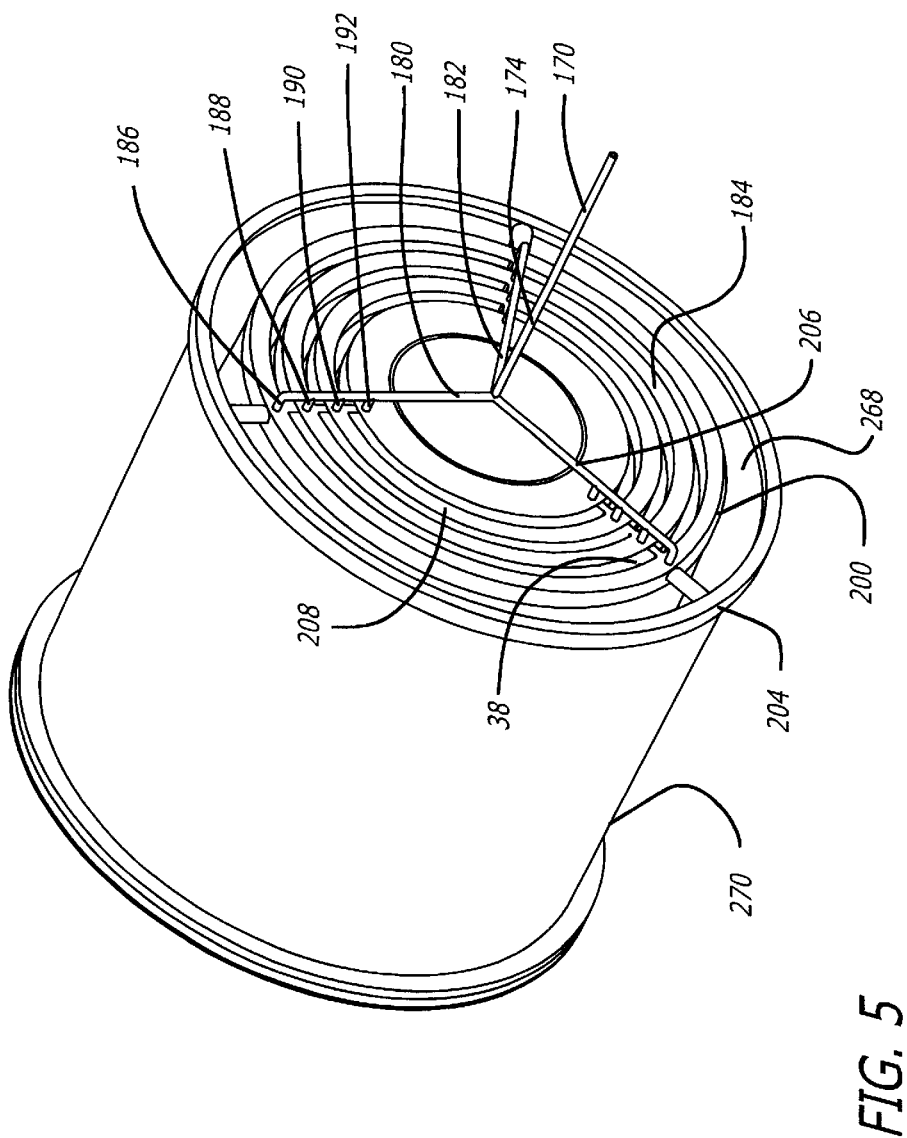
FIG. 5. is a perspective view of the rotating boiler/condenser showing the condenser inlet side of an exemplary embodiment of the water reclamation system of the present invention.

The collector chamber 268 is the outermost chamber. It is formed of shell 40 and outer shell 270 (FIG. 1). Note that in the exemplary embodiment, shell 270 is tapered with its larger diameter of about 14.2 in (36.1 cm) on the right side of the shell. When the pure condensed liquid flows out of tube 254 and into the collector chamber, centrifugal force tends to cause the liquid to flow toward the larger diameter end (right side) of the shell 270. The right end of the collector chamber is not blocked (FIGS. 1 and 5). Consequently, the condensate flows off the end of shell 270 and into a trough 280. The outside dimension of the trough is greater than the larger diameter of the shell 270. Therefore, centrifugal force causes the condensate to pool circumferentially in the trough.

A stationary dipper tube 286 extends from an open end 288 in the trough 280 to a fitting 290 at the hollow shaft 122. The dipper tube is fixed to the shaft and does not rotate with the inner housing 50. The open end 288 faces the direction of rotation of the inner housing. Therefore, the pure condensate enters the open end at a high velocity and tends to flow in the dipper tube from the open end toward the fitting and hollow shaft. The dipper tube is shaped to facilitate flow of condensate toward the hollow shaft 122

The central opening 292 of the hollow shaft 122 has a larger diameter than the outside diameter of the inlet tube 170 (FIG. 1). That central opening extend to the fitting 290 so that the pure condensate flows through the central opening where it is collected at the end of hollow shaft 122. A small pump may be necessary to overcome possible slight kinetic losses on the condensate from inside the system to the final collection at atmospheric pressure.

Meanwhile, the sludge, i.e., the more concentrated contaminated liquid that has not vaporized, is moving to the left (FIG. 1) along the inside facing walls of the boiling chambers (e.g., wall 40 of boiling chamber 36). Note that the shells also taper with the larger diameter on the left side. Centrifugal force, therefore, causes the sludge to flow to the left. When the sludge reaches the left ends of the shells, the centrifugal force throws the sludge outward where it collects in a circumferential trough 300. Centrifugal force causes the condensate to pool in the trough.

A stationary dipper tube 302 for the sludge, which is similar to the other dipper tube 286 for the pure condensate, extends from an open end 304 in the trough 300 to a fitting 306 at the hollow shaft 120 (FIGS. 1 and 9). The dipper tube 302 also does not rotate with the inner housing 50. The open end 304 faces the direction of rotation of the inner housing so that the sludge enters the open end at a high velocity and flows toward the fitting 306 and hollow shaft 120 (FIG. 9). The dipper tube is shaped to facilitate flow of condensate toward the hollow shaft.

As FIG. 9 shows, fitting 306 has an annular groove 308 that communicates with the dipper tube 302. One or more bores 310 extend from the annular grove into the center 312 of the hollow shaft 120. Center 312 is fixed to end cap 84; it does not rotate. Sludge flows though the center of the shaft where it is collected.

The shells taper in the exemplary embodiment so that centrifugal force acting on the liquid enhances the fluid flow toward the larger diameter end. Alternatively, the shells may be cylindrical. Fluid still would flow with cylindrical walls. Because the contaminated liquid forms a thin film on the boiler walls (e.g., the inside of outer wall 40 (FIG. 1)), as more contaminated liquid is injected into one end of the shell, the g forces create a thin, even liquid level. That causes liquid to flow toward the opposite end of the shell wall, in a sense making the liquid level even. In fact, the g forces should be sufficient to cause liquid to flow upward along the wall even if the shells are mounted vertically (i.e., vertical axis of rotation 132 such as in FIGS. 12 and 13)). Vertical mounting may enhance migration of sludge downward along the boiler wall so it can flow off the bottom end of each shell for collection.

Figure 13:
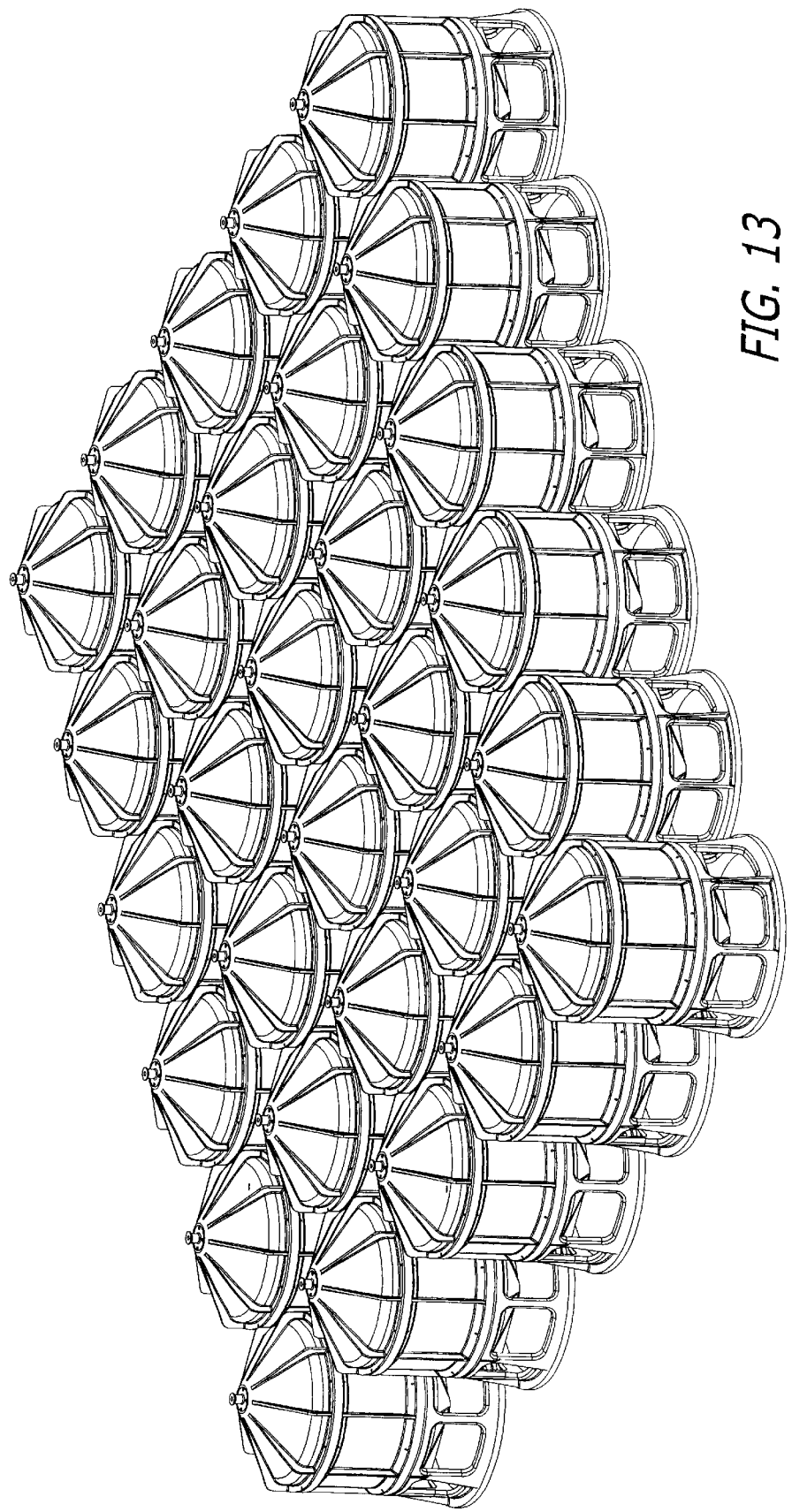
FIG. 13 is a perspective view of an array of 30 such vertically-mounted systems.

FIG. 13 shows how thirty systems in a 6×5 array can mount conveniently together. Assuming that each system touches an adjacent system, the array would be less than 10 ft (3.1 m)×8.5 ft (2.6 m). That array is small enough to fit on the bed of many small trucks. Further, with the heights of the array with stands less than 3 ft (0.9 m) high, two levels of arrays could fit on the truck. That would allow 60 systems to be transported quickly to an emergency location to make potable water, treat contaminated liquid or for some other use. Continuous output of this example is expected to produce 21,000 gallons (79,000 liters) of fresh water per day. The system only needs 48 HP (35.7 kW) of power.

High speed rotation of large-diameter objects can create balancing problems. Applicants contemplate using real-time, automatic 2-plane balancing of the shell assembly 50. Placing two or more weights that can move on circumferential tracks along the shells is one way to balance the system. Sensors to measure balance and to control azimuth placement of weights on a real time basis would maintain continuous balance and stability of shell assembly during normal operation.

As the water from the incoming brine or contaminated liquid vaporizes, salts or sludge remain on the boiler surface of the shell (e.g., shell 40). Because of the low temperature at which the system of the present invention operates, heat will not cause chemical reactions of the contaminates. Still, some sludge or salt may tend to collect on the boiler surface. Further, some incoming contaminated fluids may be quite viscous. Similarly, the process may vaporize enough water from the contaminated fluid that the resulting sludge is viscous. Accordingly, one or more high pressure spray nozzles direct water at each boiler surface of the respective shells. FIG. 1 shows one such spray nozzle 320. The nozzles can be aimed permanently, or computer control can aim the nozzles, moving them to direct a pulsing spray against the wall as the wall rotates in front of the nozzles. This pulse spray loosens sludge so that centrifugal force carries the sludge to the left and off the end of the shells. In FIG. 1, the nozzle is on the left side of the rotating shells, but it can be on the right side. Alternatively, a single high pressure nozzle that is moved radially on a radial track on the boiler exit side of the rotating shells could clean all the boiler shells automatically.

Applicants anticipate that the cleaning nozzles would operate during normal operation of the system. If desired, compressor 220 could be stopped occasionally to stop vaporizing incoming liquid. The flow of incoming liquid could also be stopped. Shell rotation would continue, however. The loosened sludge then flows from the left side of the shells and is collected as described. A small hydraulic accumulator could generate squirts or pulses of water at a high pressure could accomplish this task.

Though not shown in FIG. 1, the left side of the boiling surface of the shells, such as shells 40 and 32, may have a short annular dam at the axis end. The dam would be slightly higher than the planned height of the thin film. Applicants anticipate, however, that the fluid flows of incoming contaminated liquid or contaminated liquid could be controlled such that the desired amount of fluid could be evaporated without the need for a dam.

The system may be designed such that all fluids exit or leave through one end cap, or the inlets and outlets can be separated. Fluids also can exit the vacuum chamber through the wall that forms the center cylindrical section 88 (FIG. 1).

Because of the small diameter of the shells in the FIG. 1 embodiment, the shells can be formed using conventional forming techniques. Stainless steel shells can be edge-welded to form a cylinder, or the edges can be angled to form a tapered shell. Cylindrical shells can be extruded and then stretched on a mandrel. Plastic shells would be molded in their desired shape. Electro-deposition on a wax mandrel as a finished part is another fabrication technique.

Larger shells, such as a 5 ft diameter one, may require fabrication techniques to keep costs down.

FIGS. 15 and 16 show one method for constructing cylindrical shells. Many narrow slats 402 and 410 form shell 400. Each slat has a main wall 408, 416 and an a pair of inwardly extending side webs 404 and 406, 412 and 414 (FIG. 16). Main walls 402 and 416 may be curved as shown, or they may be planar. The slats may be extruded, rolled or formed using other metal working techniques. The webs also add strength to the shell, which may be important for larger diameter shells. They also channel the fluid longitudinally along the shell walls. The slats are welded or cemented together along the webs. Because it is important to maintain pressure differences between the boiling and condensing chambers 36 and 38, the welds must seal the webs without leakage. Laser, TIG or other welding method are acceptable as long as the joints are strong and leak tight.

Constructing the shells from slats allows the shell circumference and consequently the diameter to change as the number of slats varies. Thus, the width of each slat is $S_1$. The height of each web is $S_2$. Assume that 100 slats 402 and 410 form the outermost shell and assume further that that shell has a 5 ft (1.52 m) diameter. The circumference, therefore, is 15.7 ft (4.8 m). Each slat would be 0.155 ft or about 1.89 in (4.72 cm) wide. Decreasing the circumference by that amount by forming a shell with one fewer slat would result in a circumference of 15.5 ft (4.6 m) and a diameter of 4.95 ft (1.51 m). Thus, the circumference of a shell with one slat removed would be 0.11 ft (1.3 in; 3.3 cm) less. The space between the shells would be one-half that distance or about 0.7 in (1.8 cm). As the shells get progressively narrower, the difference in diameters and, consequently spacing, changes. Slats of different dimensions could be provided for the shells closer to the axis of rotation to compensate for this change.

For the previous discussion, the number of slats was chosen at 100 for ease of calculation. The number of slats and their widths could change to provide a desired change in spacing of adjacent shells. Applicants also anticipate having far fewer slats and having the same number of slats of slightly different sizes for each different shell diameter. Webs such as webs 404, 406, 412 and 414 (FIG. 16) could be provided for added strength.

Other shell-forming techniques are also contemplated. One could form a shell of one piece by placing a sheet of stainless steel, aluminum or other suitable material around a mandrel and welding the edges together. Using a continuous roll of metal would lower costs. Because of the thinness of the material, however, that technique may prove difficult even if the shell can form properly.

If a tapered shell is warranted, FIG. 17 shows one way to make such shells. Sheet 420 is stainless steel, aluminum or another conductive material and is cut into the shape shown in the figure. The shape is exaggerated in FIG. 17 to show the concept. The sheet is wrapped around a conical mandrel with edges 422 and 424 butted together and welded. The welded sheet forms a conical or tapered shape. The degree of taper varies with angle 426. A smaller angle yields a gentler taper than a larger angle yields.

Figure 2:
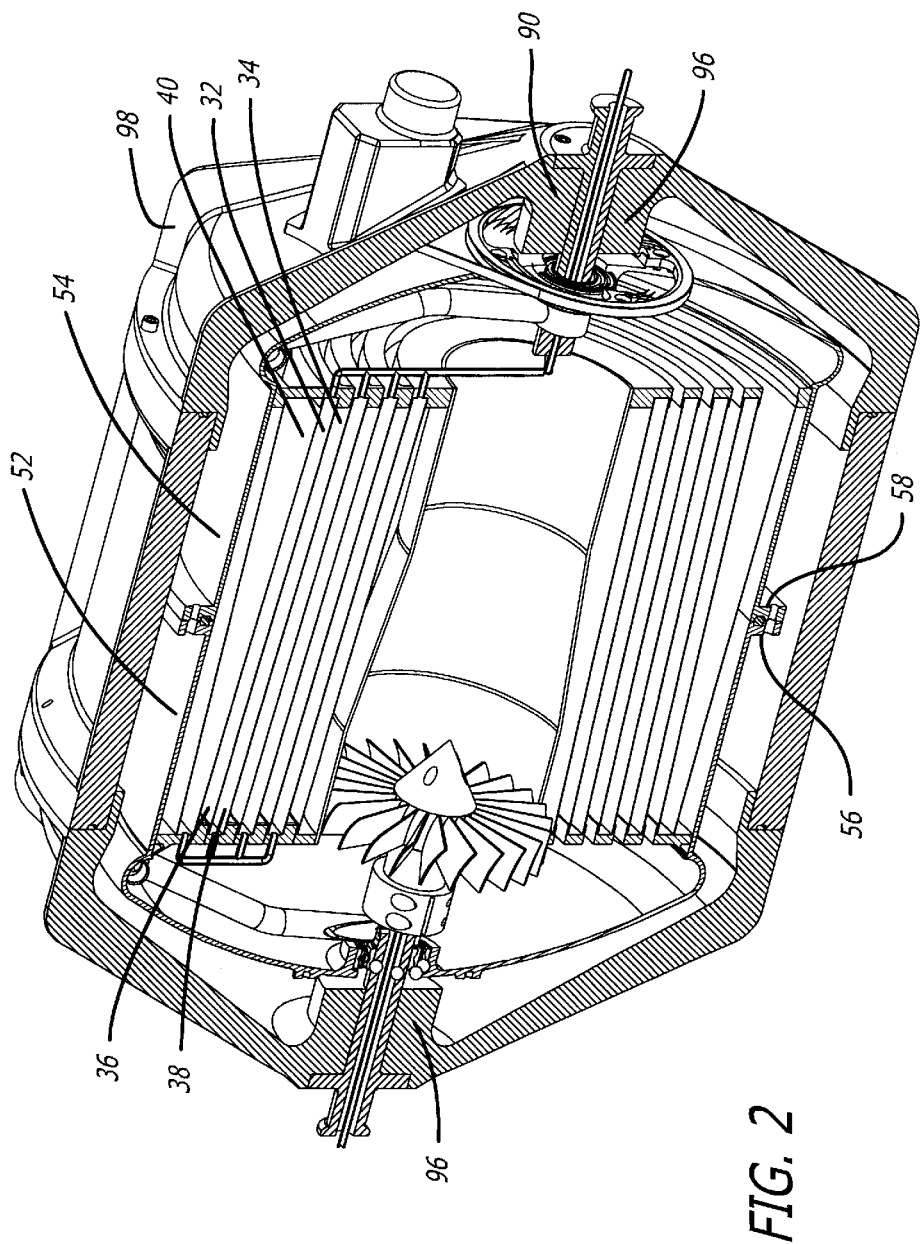
FIGS. 2, 3 and 4 are perspective, cutaway views of an exemplary embodiment of the water reclamation system of the present invention. Each view is from a different vantage point.

Thus, in the FIG. 2 embodiment, the pure water collects on the right side shells, and the sludge collects on the left side. As the pure water flows over the right edge of its shell, its momentum carries it into pure water trough 280. Centrifugal force holds the pure water within the trough. A valve (not shown) in the wall of trough 280 allows the pure water to flow out of the trough where it collects along the bottom 93 of the wall that forms the center cylindrical section 88. The exemplary method of removing pure water is discussed in more detail with reference to stationary dipper tube 286, below. However, the centrifugal force acting on the fluid within the trough causes the pure water to collect, and it then is directed to outlet 282 (FIG. 2). A pump (not shown) overcomes the pressure differential between the vacuum within tank 92 and ambient air pressure and pumps the pure water into outlet 282. That water is collected for use. A valve (not shown) may also be provided for controlling the output of the pure water.

As the sludge flows over the left edge (FIG. 2) of the shells, the momentum sprays the sludge into trough 190. A ventricle pump 192 forces the liquid sludge through tubing into outlet 194. The outlet and the ventricle pump are stationary and do not rotate with the shells. An outlet in trough 190 sprays sludge into a collector for the pump. The pump pressurizes the sludge and directs it into outlet 94. The pumped sludge then flows into manifold 196, outlet tube 48 and outlet 50 where it is collected.

Both the pure water and the sludge collect in their respective troughs. The valves that allow the water or sludge to flow out of the troughs are controlled to maintain some level of water or sludge for maintaining the vacuum within the system.

Figure 18:
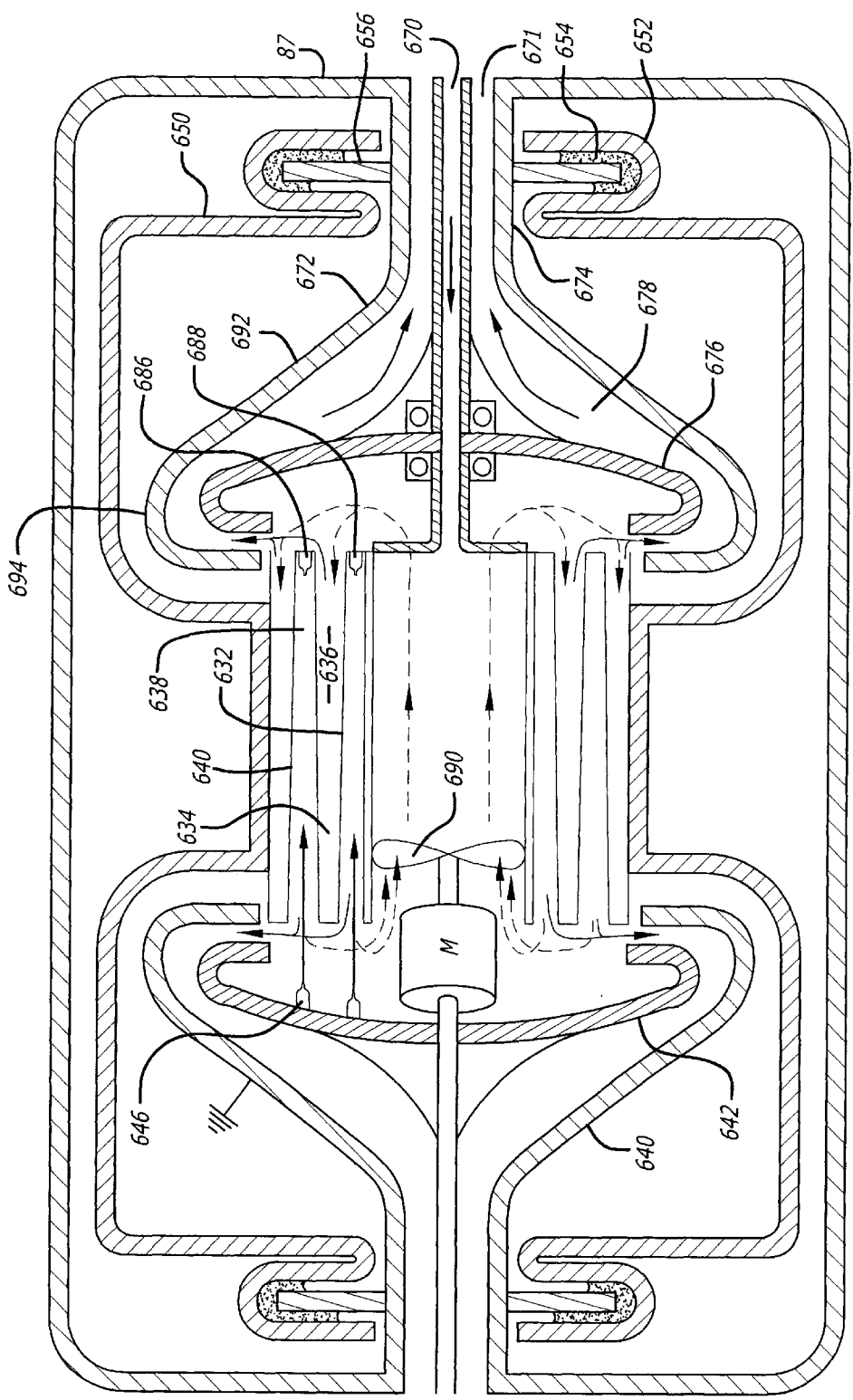
FIG. 18 is a side view of another embodiment of the present invention highlighting the waste and pure output streams spraying radially outwards into stationary exit funnels.
Figure 19:
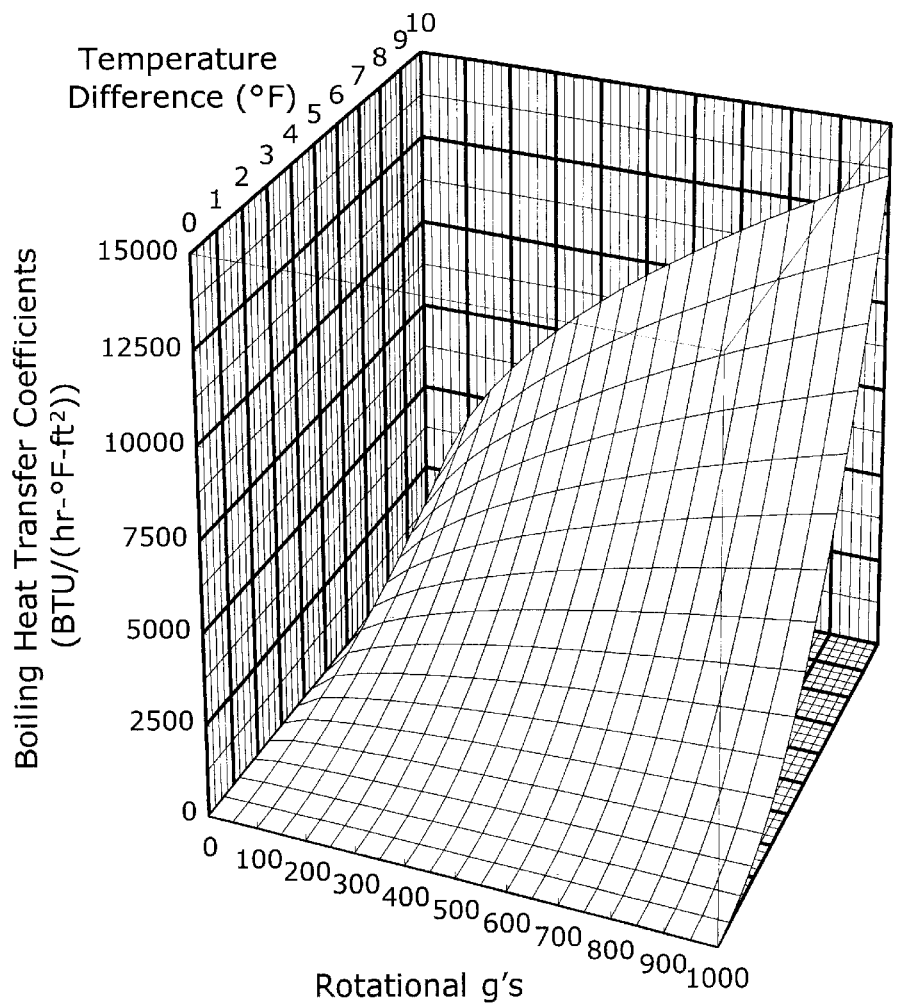
FIGS. 19 through 24 are 3D surface plots showing predicted boiling heat transfer (in BTU/ (hr ° F. ft$^2$)) for different rotational g's and $\Delta T$. Each surface plot is for a different shell material coating and different ambient temperature condition, which are stated in the chart.
Figure 20:
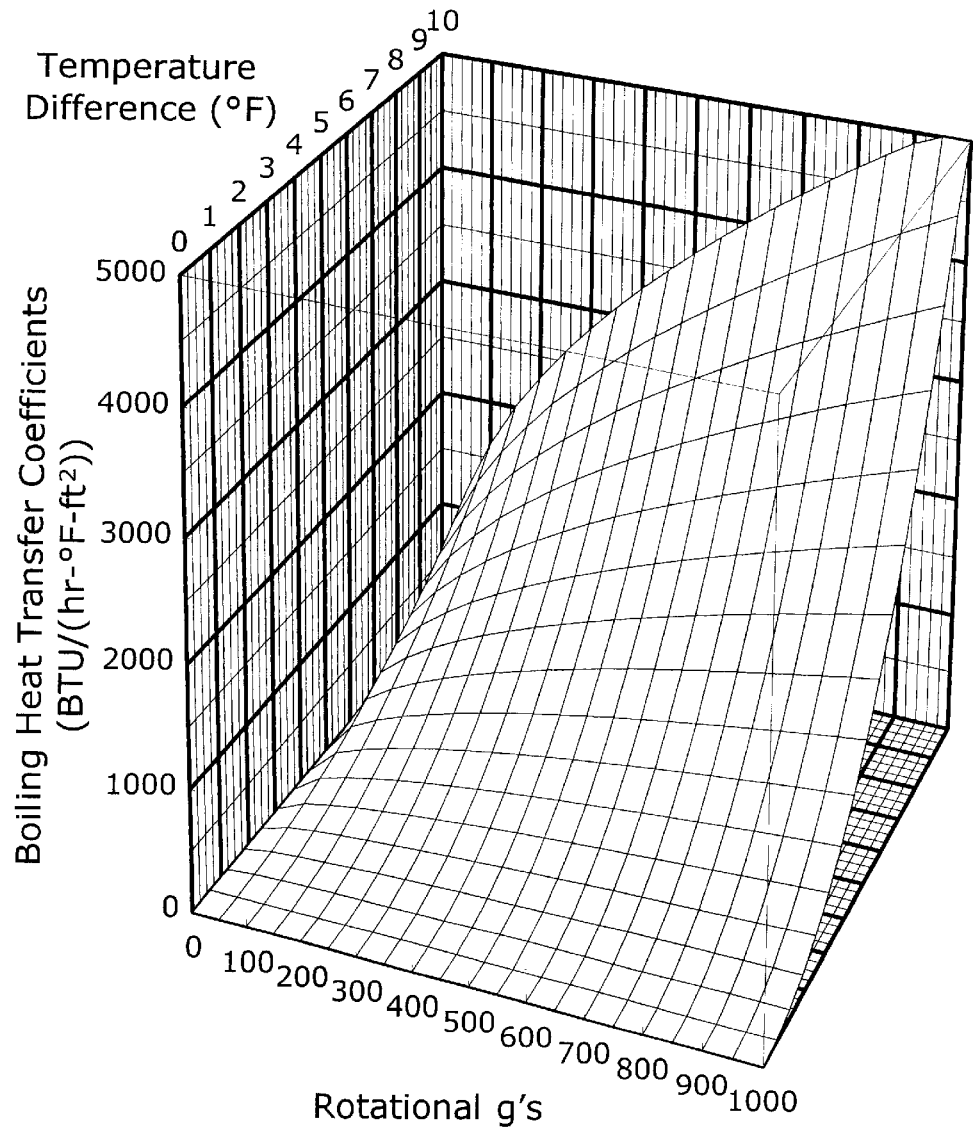
Figure 21:
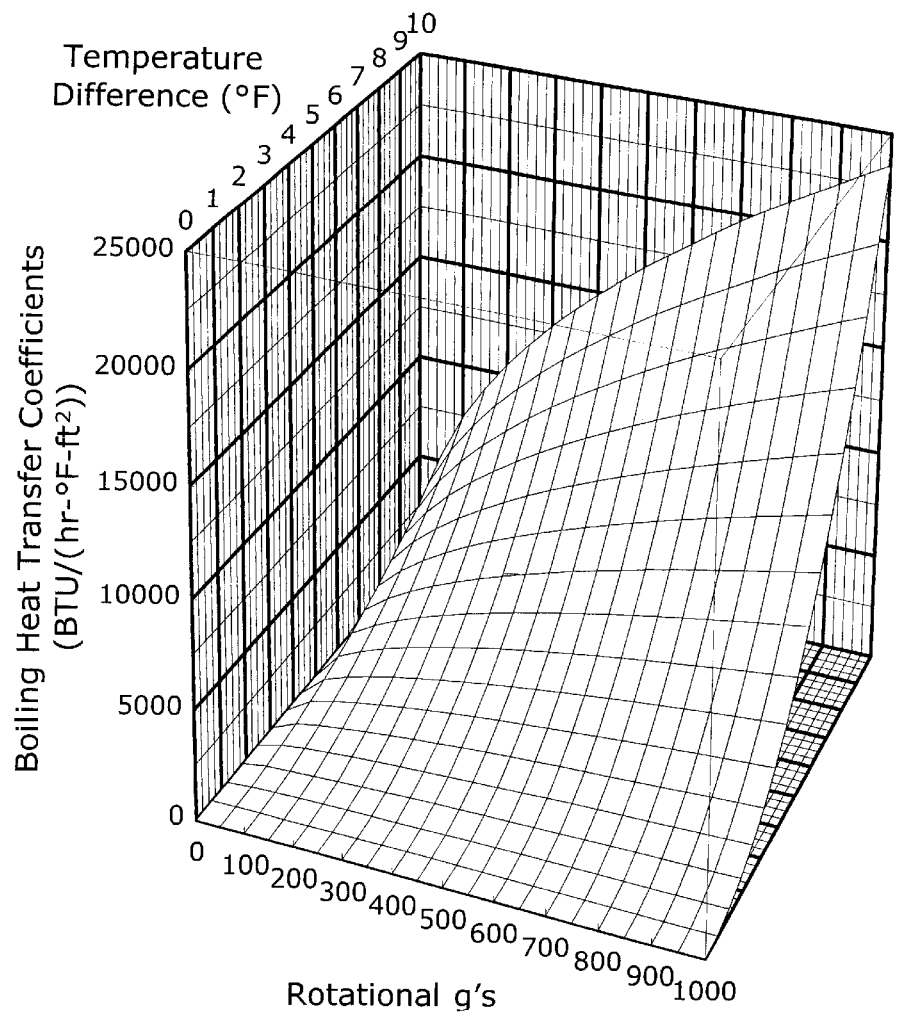

FIG. 18 shows another proposed collection system. In that embodiment, brine or contaminated liquid enters the system from inlet 670. Tubes carry the liquid to injectors 686 and 688 (shown schematically). The branches that carry liquid from inlet 670 are not shown in FIG. 18. Water in the boiling chamber (e.g., chamber 638) flows along wall 640 in a thin film where it is vaporized. The vapor then travels past fan 690 and into the condensing chambers such as chamber 636. Pure water condenses and is flung radially as it exits the right side of the shells. Note that adjacent shells taper in different directions in the FIG. 18 embodiment. Also, the left side of the condensing chambers (i.e., the boiler exit side) are closed. Therefore, the condensate flows to the right in this embodiment.

The condensate then collects in a bowl-shaped collector 692. The bowl-shaped collector has a trough-like annular ring 694 that tapers outward and together at 672 until it curves again at 674 to close around inlet tube 670. An inner bowl 676 also does not rotate. It forms a channel 678 between itself and the bowl-shaped collector 676. Pure water from the right side of rotating shell housing 650 flows under high velocity toward the ring-shaped portion 694. Its momentum carries the liquid along channel 678 where it then flows into outlet 671. Bowl-shaped collector 640 is the mirror of bowl-shaped collector 692, and it collects the sludge in a similar manner. Note that inner bowl 642 on the left side of FIG. 18 provides a surface on which to mount cleaning nozzles 646.

FIG. 18 also shows a possible seal, especially for larger units. The rotating inner housing 650 has an annulus 652 surrounding inlet 670 and outlet 671. The annulus contains a viscous liquid 654. An annular plate 656 extending outward from region 672 of the bowl-shaped collector 692 extends into the annular ring 652. As the inner housing 16 rotates at high velocities, the viscous liquid 654 will form a dense seal preventing air from flowing past it.

Boiler and Condenser Surface Area Design: To increase the system water processing output flow, the boiler and condenser surface area must be as large as possible and still be cost effective and practical. The output flow is linearly proportional to the boiler surface area as shown in Equation (6). One unique feature of the water processing system of the present invention is that it uses a common boiler and condenser wall surface. For efficient packaging and provided high heat transfer can be achieved, designing the boilers and condensers to be concentric shells with small separations between them and with decreasing radii inside one large cylindrical container, represents the best space saving layout. The analysis that follows presents relations that compute the total surface area of the combined boiler and condenser surfaces for one embodiment of the present invention. These relations predict the weight and cost of the system and the output flow performance.

The application has discussed three adjacent, concentric shells such as shells 32, 34 and 40 (FIG. 1). Another way of considering the shells is to think of them as pairs having a boiler and condenser shell. Thus, the system has a set of boiler shells and a set of condenser shells. One of the boiler shells and the adjacent condenser shell form a group pair about a common axis. The next boiler and condenser shell adjacent to the first-mentioned pair, also form a pair about the same axis.

Figure 3:
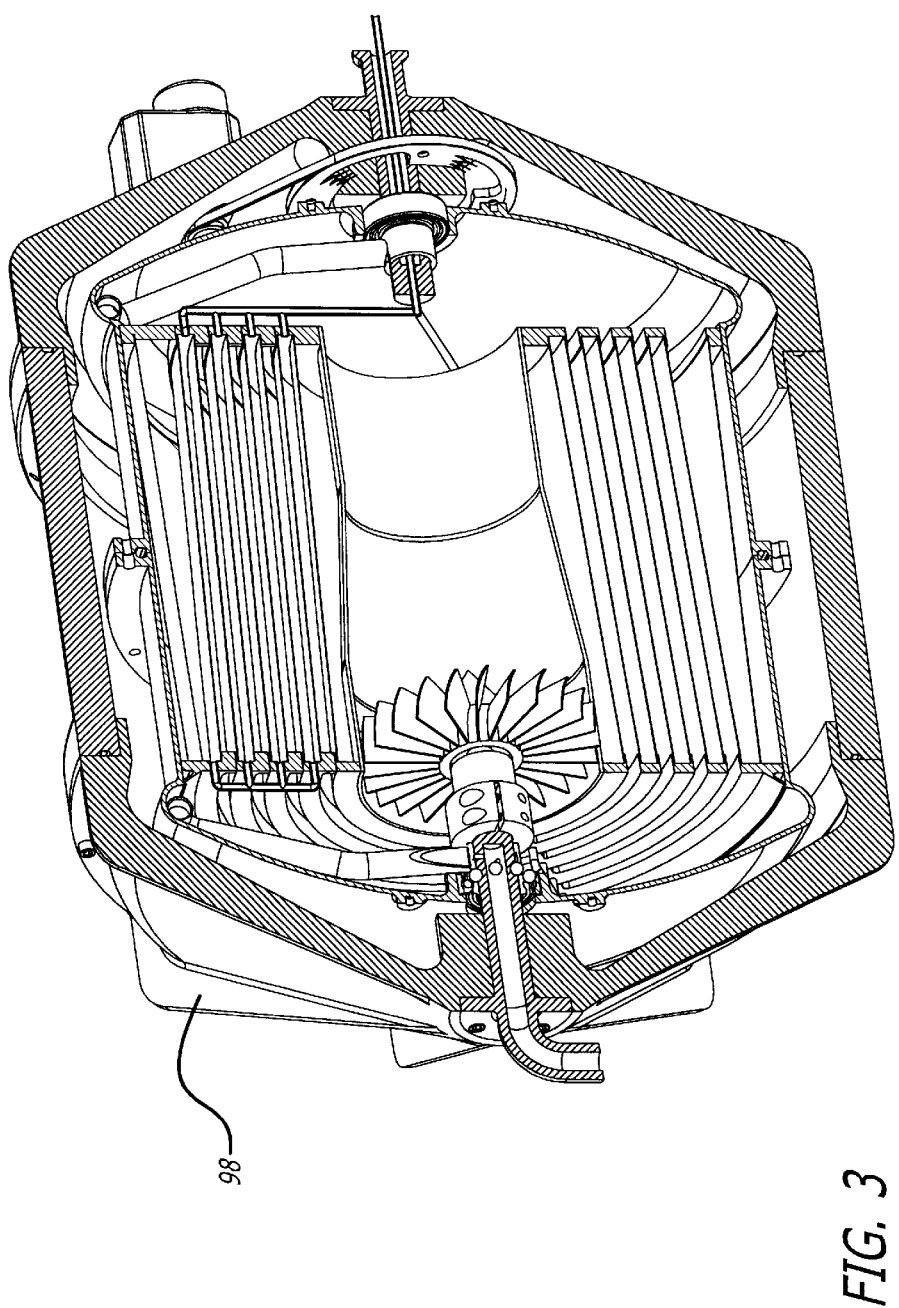

As FIGS. 2 and 3 show, a fixed radial spacing $\Delta R$ exists between each shell. In theory, the spacing can vary, but the exemplary embodiment provides fixed spacing. The following relations compute the total area of all boiler and condenser shells:

$$A_{Total} = \tag{11}$$

$$2\pi L \sum_{i=1}^{N} R_i = 2\pi L[R_1 + R_2 + R_3 + \ldots + R_N] = 2\pi L \left[ R_1 + \sum_{i=2}^{N} R_i \right].$$

In this expression N is the number of boiler and condenser shells given by:

$$N = 12 \frac{(R_N - R_1)}{\Delta R} + 1. \tag{11a}$$

This expression has the following definitions:

$R_1$ & $R_N$=Inner and outer shell radii; (ft) (11b)

$\Delta R$=*Separation between each shell; (inches)* (11c)

$R_i$=Radius of each shell i; (ft) (11d)

$L$=Length of all shells; (ft). (11e)

Designing the entire system to have a common separation $\Delta R$ between each shell minimizes production costs and maximizes output flow capacity. The following relations exist between the shell radius of the "$i^{th}$" shell and the shell separation $\Delta R$:

$$R_2 = R_1 + \Delta R/12$$

$$R_3 = R_2 + \Delta R/12 = R_1 + 2\Delta R/12$$

$$R_4 = R_3 + \Delta R/12 = R_1 + 3\Delta R/12$$

$$R_i = R_{i-1} + \Delta R/12 = R_1 + (i-1)\Delta R/12; \; i=2,N \tag{12}$$

Therefore, from equations (11) and (12) above, the sum of the radii is given by:

$$\sum_{i=2}^{N} R_i = \sum_{i=2}^{N} R_1 + \sum_{i=2}^{N} (i-1)\left(\frac{\Delta R}{12}\right) = (N-1)R_1 + \sum_{i=2}^{N} (i-1)\left(\frac{\Delta R}{12}\right). \tag{13}$$

The second sum term in equation (13) is evaluated incorporating the following terms:

$$\sum_{i=2}^{N} (i-1)\left(\frac{\Delta R}{12}\right) = \left(\frac{\Delta R}{12}\right)[1 + 2 + 3 + \ldots + (N-3) + (N-2) + (N-1)]. \tag{14}$$

In the summation algorithm, each inner- and outer-most term adds up to N, and there are (N−1)/2 of those terms as shown:

$$1 + (N-1) \tag{14a}$$
$$\vdots$$
$$3 + (N-3)$$
$$2 + (N-2)$$
$$1 + (N-1)$$

Therefore, the sum given by equation (14) is:

$$\sum_{i=2}^{N} (i-1)\left(\frac{\Delta R}{12}\right) = N\frac{(N-1)}{2}\left(\frac{\Delta R}{12}\right). \tag{15}$$

Substituting equations (13) and (15) into equation (11) gives the total area of all the boiler and condenser shells, which equals:

$$A_{Total} = 2\pi LN\left[R_1 + \frac{(N-1)}{2}\frac{\Delta R}{12}\right] \tag{16}$$

$$A_{Total} = 12\pi L\frac{(R_N + R_1)}{\Delta R}\left[(R_N - R_1) + \frac{\Delta R}{12}\right]. \tag{17}$$

In that equation, $A_{Total}$=Sum total of all the shell areas (ft$^2$) (17a)

$R_1$=Inner most shell radius (ft) (17b)

$R_N$=Outer most shell radius (ft) (17c)

$\Delta R$=Separation between shells (inches) (17d)

$N$=Number of boiler shells (17e)

The weight of the boiler and condenser shells can be determined from their known weight density, shell thickness t and surface area $A_{Total}$. The weight is given by:

$$w_{shell} = \rho_{shell} V = \rho_{shell} t A_{Total} 144 \qquad (18)$$

$$w_{shell} = \rho_{shell} t 288\pi LN \left[ R_1 + \frac{(N-1)}{2} \frac{\Delta R}{12} \right] \qquad (19)$$

$$w_{shell} = \rho_{shell} t 1728\pi L \frac{(R_N + R_1)}{\Delta R} \left[ (R_N - R_1) + \frac{\Delta R}{12} \right] \qquad (20)$$

In these expressions, $\rho_{shell}$=Weight density of boiler/condenser shells (lbs/in$^3$) (20a)

$t$=Shell thickness (inches). (20b)

Energy Requirements: As discussed previously, the source of energy or heat required for the boiling and condensing process comes entirely from the vapor compressor system 220. The system is adjusted to operate near a boiling water vapor pressure that is commensurate with its ambient temperature. The proposed compressor creates a pressure ratio of about 1.05 to 1.25 on the water vapor that is able to boil at ambient temperature conditions (~70° F. or 21° C.) about 0.5 psi (0.035 kg/cm$^2$) or less. Consequently, the work done by the compressor is very low. See, e.g., Keenan, J. H. and Keyes, F. G., "Thermodynamic Properties of Steam" John Wiley & Sons, 1936, pp. 28–31.

Though the Keenan and Keyes process envisions a piston-cylinder pressure and volume change, conservation of energy makes the process general and applicable to all compressor designs. Only the input and output thermodynamic states (pressures) and the specific type of thermodynamic process are necessary to predict the energy requirements of the system.

Beginning from first principles, the following discussion presents an analysis of the compressor power requirements for the distillation process. This analysis computes the work performed by the compressor on the fluid by considering the process to be adiabatic, i.e., no heat energy flowing into or out of the compressor other than what is carried by the work done on the compressed fluid. For each "cycle" of the compressor, the relative amount of heat transferred to the compressor and its surroundings compared to the amount of heat transferred to the fluid is small and decreases with increased compressor efficiency. Inefficiency losses of the compressor result in reduced laminar kinetic flow of the vapor and increased turbulent kinetic flow. These losses are minimized with the appropriate compressor design. Still, the inefficiency losses of the compressor can still be applied to the end result to determine the approximate overall energy requirements for this distillation process.

In general, the work or energy required to compress a gas in a cylinder by a distance $d\bar{s}$ can be computed by noting that:

$$W = \int dW = \int_{S_1}^{S_2} \bar{F} \cdot d\bar{s} = \int_{S_1}^{S_2} pA \, ds = \int_{V_1}^{V_2} p \, dV. \qquad (21)$$

In that equation, $W$=Work or energy of compression (ft-lbs) (21a)

$p$=Gas pressure (lbs/ft) (21b)

$V$=Gas volume (ft$^3$). (21c)

The subscripts 1 and 2 in equation (21) refer to the two different states, i.e., input and output volumes or positions.

These volume states convert to pressure states by an adiabatic gas law transformation. In this case, the input pressure $p_1$ is the boiling vapor pressure $p_B$ while the output pressure $p_2$ is the condensing vapor pressure $p_C$ Sears, F. W. and Salinger, G. L., "Thermodynamics, Kinetic Theory, and Statistical Thermodynamics" 3rd Ed., Addison-Wesley 1975, pp. 108–109, described the governing equations. For adiabatic processes, the initial and final thermodynamic states are related by the following constant condition:

$$p_1 V_1^\gamma = p_2 V_2^\gamma = pV^\gamma = K. \qquad (22)$$

In this expression K is a constant which can be eliminated, and $\gamma$ is the ratio of specific heats at constant pressure to constant volume. The units for specific heat are (BTU/(lb ° F.)). The specific heat ratio $\gamma$, is defined by:

$$\gamma = \frac{C_p}{C_V} \qquad (23)$$

and the specific heats are related to the gas molecular weight given by:

$$R = 778.6(C_p - C_V) = \frac{1544}{\text{Gas Molecular Weight}}. \qquad (24)$$

In this expression R is the universal gas constant with units of (Ft-lbs/(° F. lb)). The work done by the compressor on the fluid can be computed by performing the integral given in equation (21). Substituting equation (22) into equation (21) and simplifying yields:

$$W = C_w \frac{\gamma}{(\gamma - 1)} p_1 V_1 \left[ \left(\frac{p_2}{p_1}\right)^{(1 - \frac{1}{\gamma})} - 1 \right]. \qquad (25)$$

The units of work in equation (25) are in Watt-hours with the constant conversion factor $C_W$, which equals:

$C_W$=Constant conversion to Watt-hours=(746/(550×3600)). (25a)

Computing the required energy per pound of water distilled from the device is useful for specifying the energy efficiency of the thermodynamic compressor process. Typical units are in watt-hours per pound (W hr/lb). This can be computed by first determining the rate of energy expenditure, which is the time derivative of equation (25). During a continuous flow process, the input and output pressures are in a steady state condition. Consequently, the only temporal variable is the input volume $V_1$, flow rate. Therefore, the equation yields:

$$\dot{W} = C_w \frac{\gamma}{(\gamma - 1)} p_1 \dot{V}_1 \left[ \left(\frac{p_2}{p_1}\right)^{(1 - \frac{1}{\gamma})} - 1 \right]. \qquad (26)$$

In this expression $\dot{W}$ is the power (watts) required for vapor compression.

Now $\dot{V}_1$ can be computed from the mass flow and density of the boiling vapor. This connects the energy requirements with the boiler and condenser mass flow output. Examining of units reveals the following relationship:

$$\dot{V}_1 = \frac{\dot{w}}{\rho_1}. \tag{27}$$

Where, $\dot{V}_1$=Boiling vapor volume flow rate (ft³/hr)  (27a)

$\dot{w}$=Mass flow of fluid vaporized (lbs/hr) given by equation (20)  (27b)

$\rho_1$=Vapor density of the boiled fluid (lb/ft³).  (27c)

The energy expenditure per pound of water produced $E_\rho^{100}$, for a perfectly efficient system, is computed by ($\dot{W}/\dot{w}$). By substituting equation (27) into equation (26), the expected ideal "energy density" becomes:

$$E_\rho^{100} = C_w \frac{p_1}{\rho_1} \frac{\gamma}{(\gamma-1)} \left[ \left(\frac{p_2}{p_1}\right)^{(1-\frac{1}{\gamma})} - 1 \right]. \tag{28}$$

Inefficiency losses of the vapor compressor and motor subsystem increase the actual energy density. If their combined inefficiency loss is $\xi$, the actual energy density is:

$$E_\rho^\xi = \frac{E_\rho^{100}}{\xi}. \tag{29}$$

The ratio of specific heats is required to solve the energy density $E_\rho^\xi$. Equation (24) is useful to eliminate from equation (23) the specific heat at constant volume, because only the specific heat at constant pressure is measurable. Substituting equation (24) into equation (23) yields:

$$\gamma = \frac{C_p}{C_p - \frac{1544}{778.6(MW)}}. \tag{30}$$

In this expression MW is the molecular weight (pounds/mole), which is 18 for water or water vapor.

The preceding equations are both temperature and pressure dependent, so the optimum thermodynamic cycle is a complex but determinable relation dependent upon the specific fluid type, ambient temperature and pressure, and contaminants in the fluid.

Figure 28:
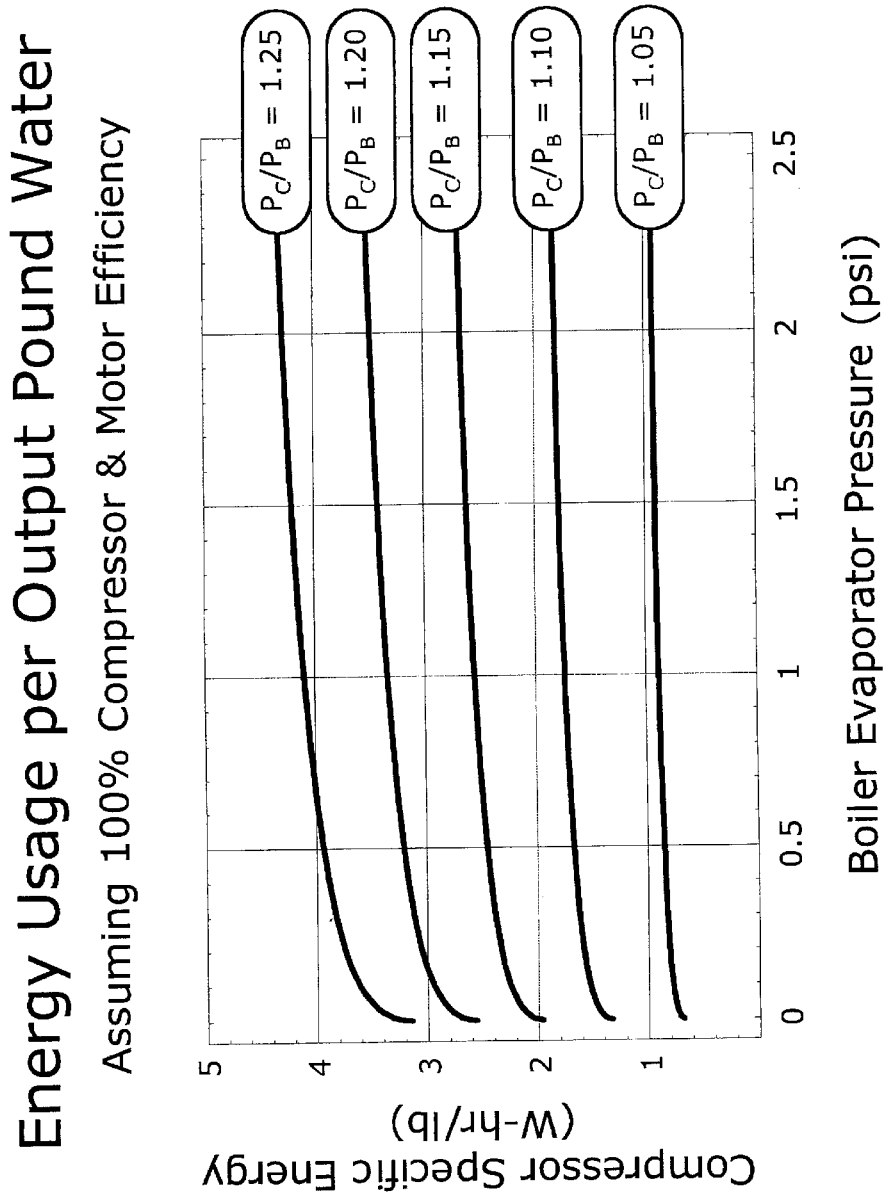
FIG. 28 is a graph showing energy usage per output pound of water for different boiler pressures and differing boiler-to-condenser pressure ratios.

To appreciate the required energy consumption per pound of water produced by this process, computations were performed using equation (28) for a perfectly efficient vapor compression and motor system. FIG. 28 shows a plot of these results.

The computations performed using equation (28) implicitly include the temperature dependent effects on the vapor density, the specific heat of the vapor and the input and output pressure states of the vapor. These effects are not explicitly shown in the equation. In the computation process, however, accurate curve fits using fifth order polynomials include these temperature dependencies.

In FIG. 28, the boiler pressure is $p_1$ or $p_B$ and the condenser pressure is $p_2$ or $p_C$. Several families of pressure ratios ($p_2/p_1$) are shown for comparison. The displayed pressure ratios are not directly apparent, but successful operation should occur with a boiler and condenser temperature differential of 4° F. (2° C.) or less. By reading the temperature values from the water vapor boiling curve of FIG. 29, temperature values can be assigned to these pressure values.

Figure 29:
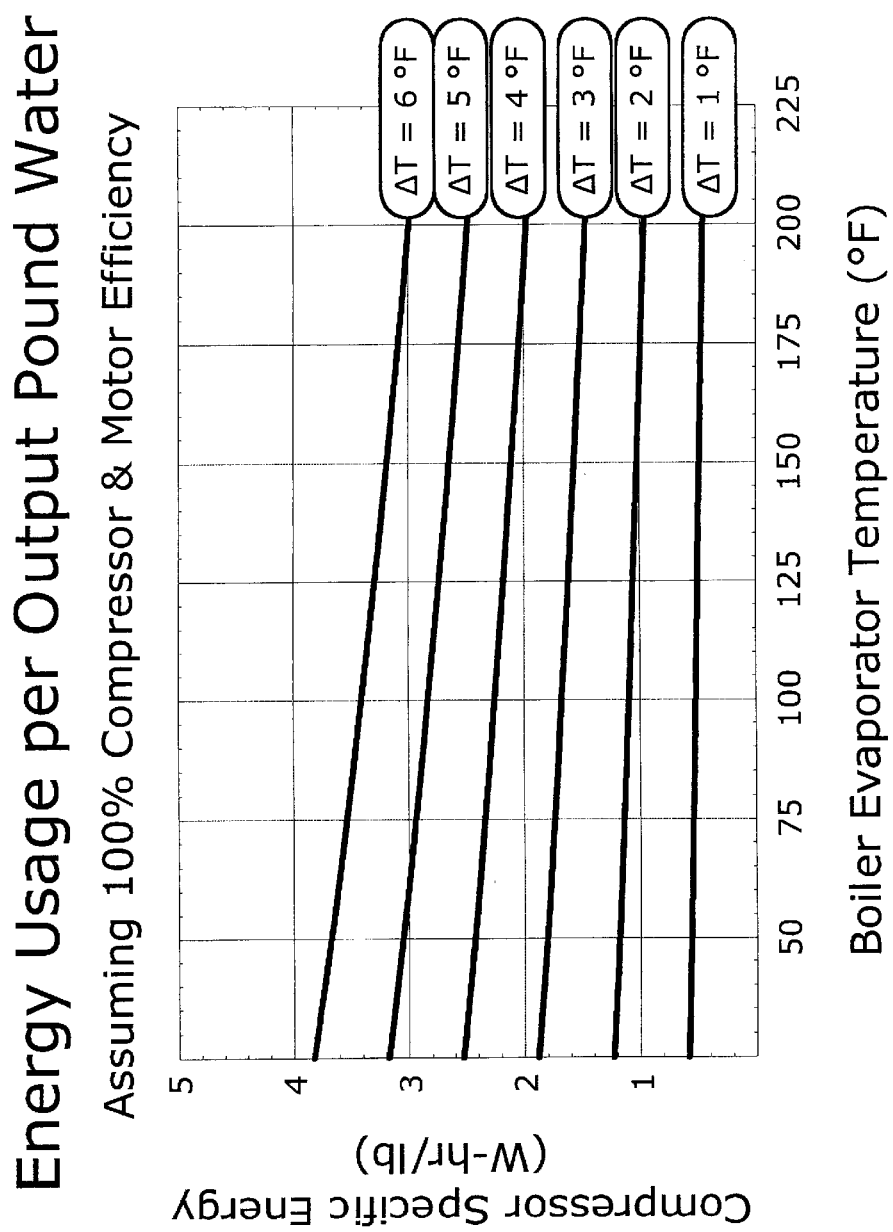
FIG. 29 is a series of graphs showing energy usage per output pound of water for different boiler temperatures and variable boiler-to-condenser temperature differences.

In FIG. 29, the increased work required to compress the gas as its density increases with pressure increases causes the general increasing trend for the family of curves of constant pressure ratio. It is not directly apparent that the condenser pressure increases faster than the boiler pressure with increasing boiler pressures. This is true, however. Therefore, the pressure differential Δp between the boiler and condenser must increase for constant pressure ratios and increasing boiler pressures. Consequently, the condenser pressure increases faster than the boiler pressure. Further, a faster increase in condenser pressure translates to an increase in condenser vapor density. This then causes the slight increase in compressor work for increased boiler pressures at fixed pressure ratios.

The family of curves shown in FIG. 29 has a decreasing work dependency as boiler temperatures increase. As the temperature increases for fixed boiler and condenser temperature differentials ΔT, the pressure ratios, ($p_2/p_1$), decrease. See FIG. 28. Similarly, the vapor densities decrease with increased temperature. Therefore, slightly less work is required to compress the gas.

Figure 30:
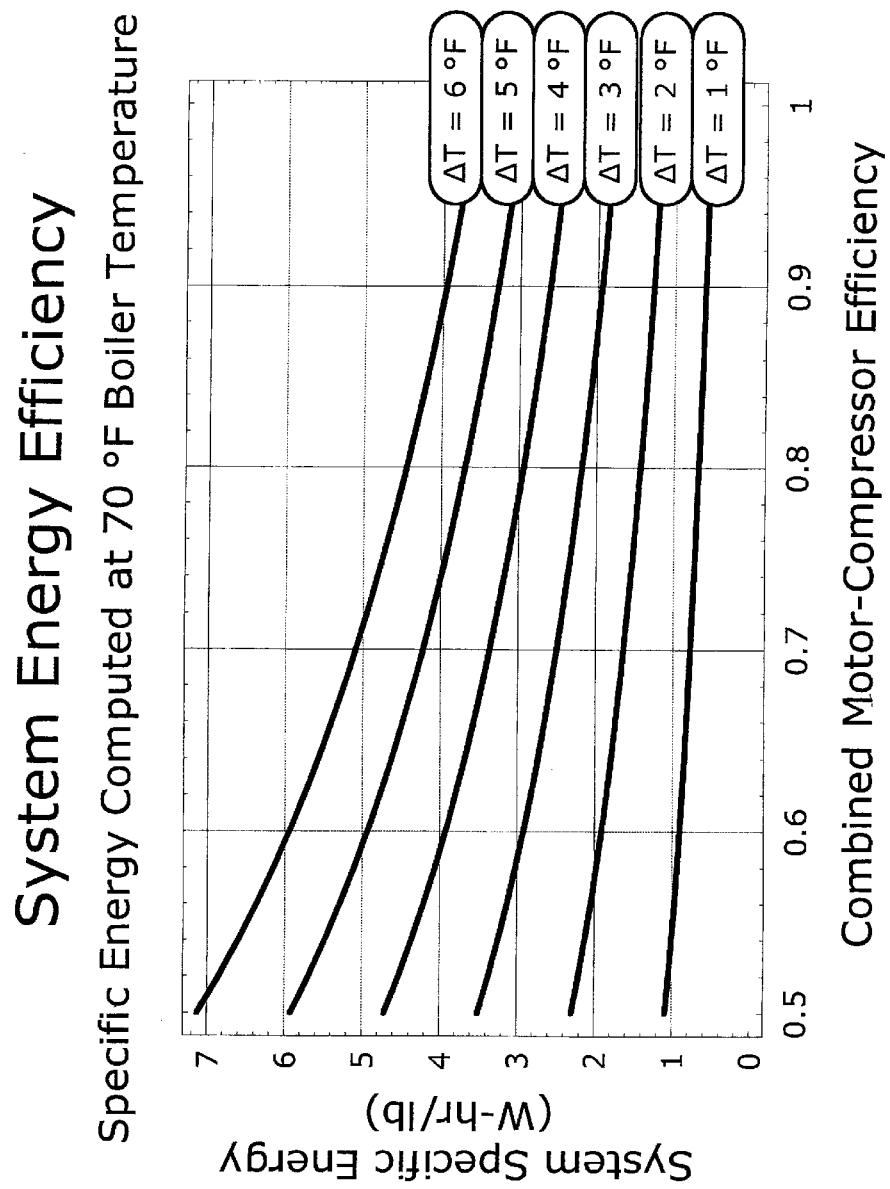
FIG. 30 is a series of graphs showing energy usage per output pound of water for differing boiler-to-condenser $\Delta T$ values based on different combined motor compressor efficiencies.

As previously mentioned, the motor and compressor inefficiencies increase actual system energy density. See equation (29). FIG. 30 shows a sample computation of the system energy density for a wide range of efficiency losses and for several different thermodynamic cycles having varying boiler and condenser differential temperatures ΔT.

The data used in FIG. 30 are the energy density values corresponding to a boiler temperature of 70° F. (21° C.) with no inefficiency losses. Large electrical motors operate with efficiencies ranging from 93% to 95%. Therefore, 94% is a reasonable motor efficiency $\xi_M$. Likewise, jet aircraft compressors have efficiencies of 85% to 90% or better. Thus, one expects a conservative compressor efficiency $\xi_C$ of 85%. The combined overall system efficiency should be equal to or greater than the following:

$$\xi = \xi_M \xi_C = (94\%)(85\%) = 80\%. \tag{31}$$

The data in FIG. 30 then represents the final expected system energy requirements per pound of water distilled assuming that no wasted heat from these inefficiency losses are utilized. They can be used effectively with appropriate heat exchangers to reduce the energy required even more.

Figure 31:
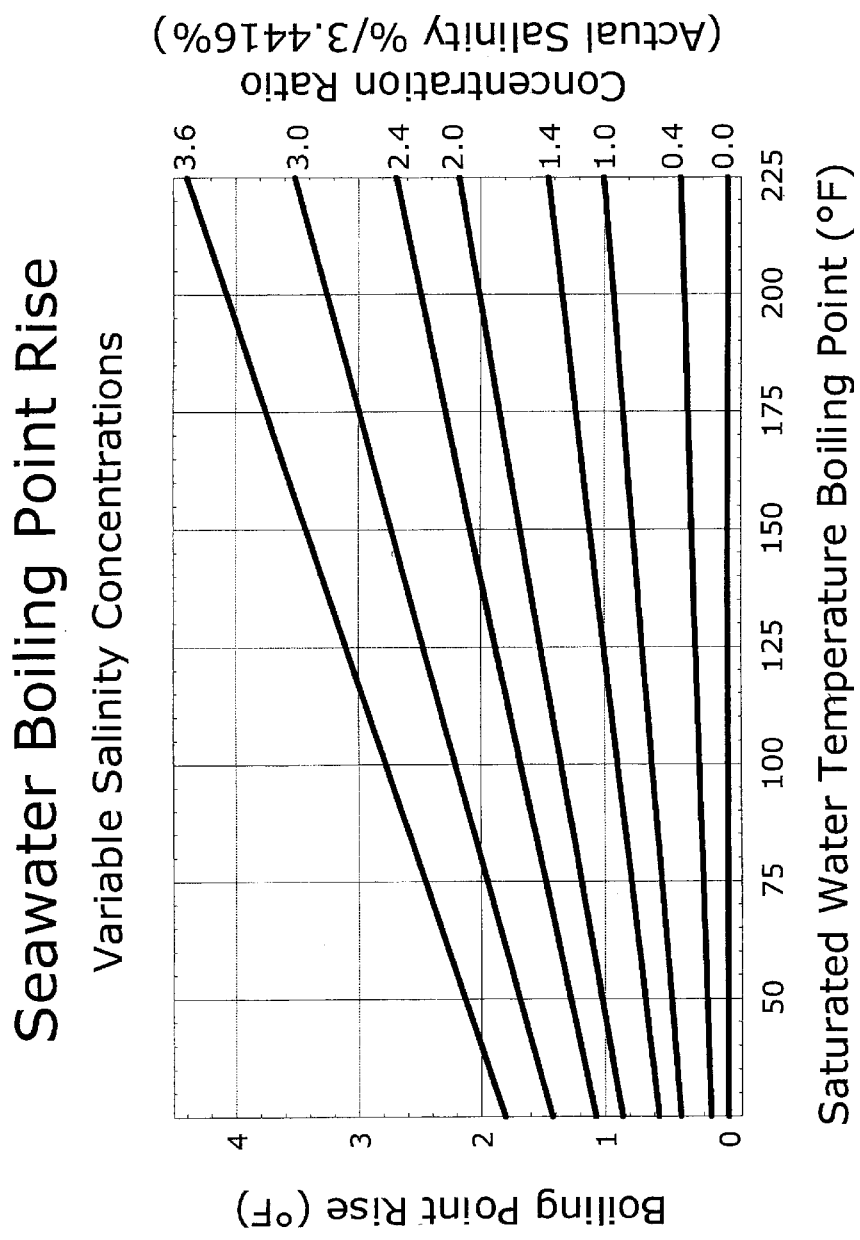
FIG. 31 is a plot showing the boiling point rise in seawater versus saturated seawater temperature due to variations in salinity concentration ratio.
Figure 32:
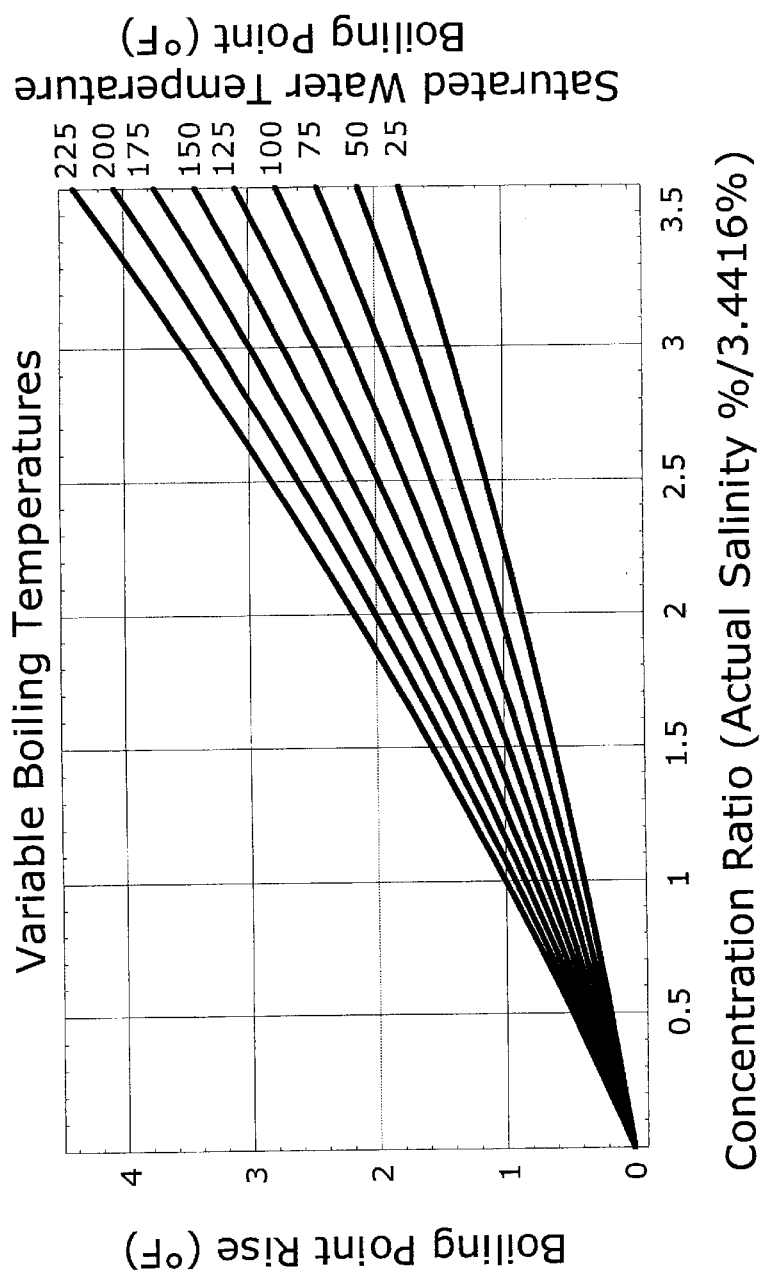
FIG. 32 is a plot showing the boiling point rise in seawater versus salinity concentration ratio due to variations in saturated seawater temperature.

The salinity concentrations present in seawater cause an increase in boiling temperature over pure water at the same pressure and temperature conditions. One can compute the increase in boiling point by using the linear relationship developed by Fabuss and Korosi for determining the boiling point rise of various seawater concentrations. See, e.g., Howe, E. D., "Fundamentals of Water Desalination," Marcel Dekker, Inc., 1974, p. 30, for a description of the linear relations between boiling point rise and salinity concentration. FIG. 31 and FIG. 32 show the graphical relations between the boiling point rise versus salinity concentration ratio at various seawater saturation temperatures. As an example, at ambient temperatures of 75° F. (24° C.), a triply concentrated salinity ratio results in slightly less than a 2° F. (1° C.) boiling rise increase. This boiling rise increase is the additional energy required when desalinating brine solutions instead of pure water.

The power costs required for the processes of the present invention can be computed by noting that the primary power source is the compressor shaft power. The system also requires an additional small amount of energy for rotational acceleration of the fluid in the boiler/condenser shells. Applicants estimate that additional energy to be approximately 0.2 W hrs/lb.

Electrical power from utilities and solar, diesel and other generators are well suited for powering the proposed water system. Assuming utility electrical power is utilized, the cost per acre-foot of water produced can be computed by the following simple relation:

$$\frac{\$}{\text{Acre Foot}} = (E_p^\xi)_{\frac{W-Hrs}{lb}}(C_\varrho)_{\frac{\varrho}{KW-Hrs}}\left(\frac{1\$}{100\varrho}\right) \quad (32a)$$

$$\left(\frac{1KW}{1000W}\right)\left(\frac{8.3454 \text{ lbs water}}{\text{gallon}}\right)\left(\frac{325{,}851 \text{ gallon}}{\text{Acre Foot}}\right)$$

or $$\frac{\$}{\text{Acre Foot}} = (E_p^\xi)(C_\varrho)(27.194). \quad (32b)$$

Figure 22:
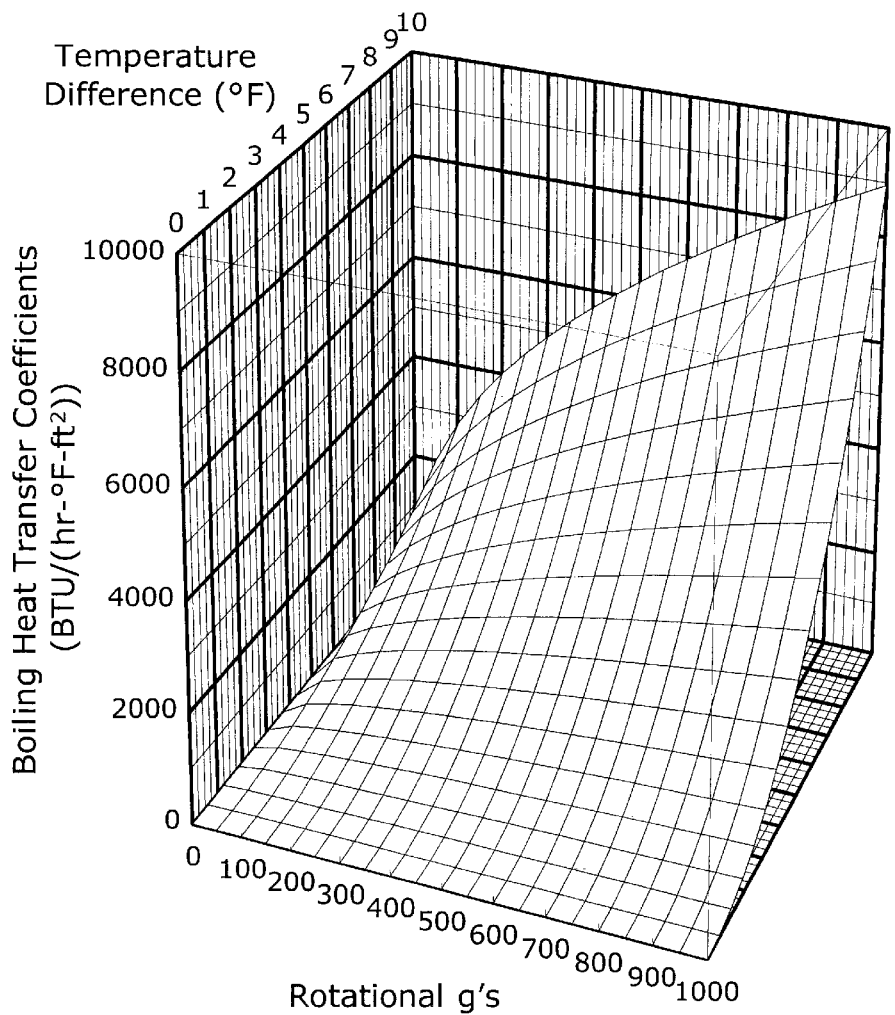
Figure 23:
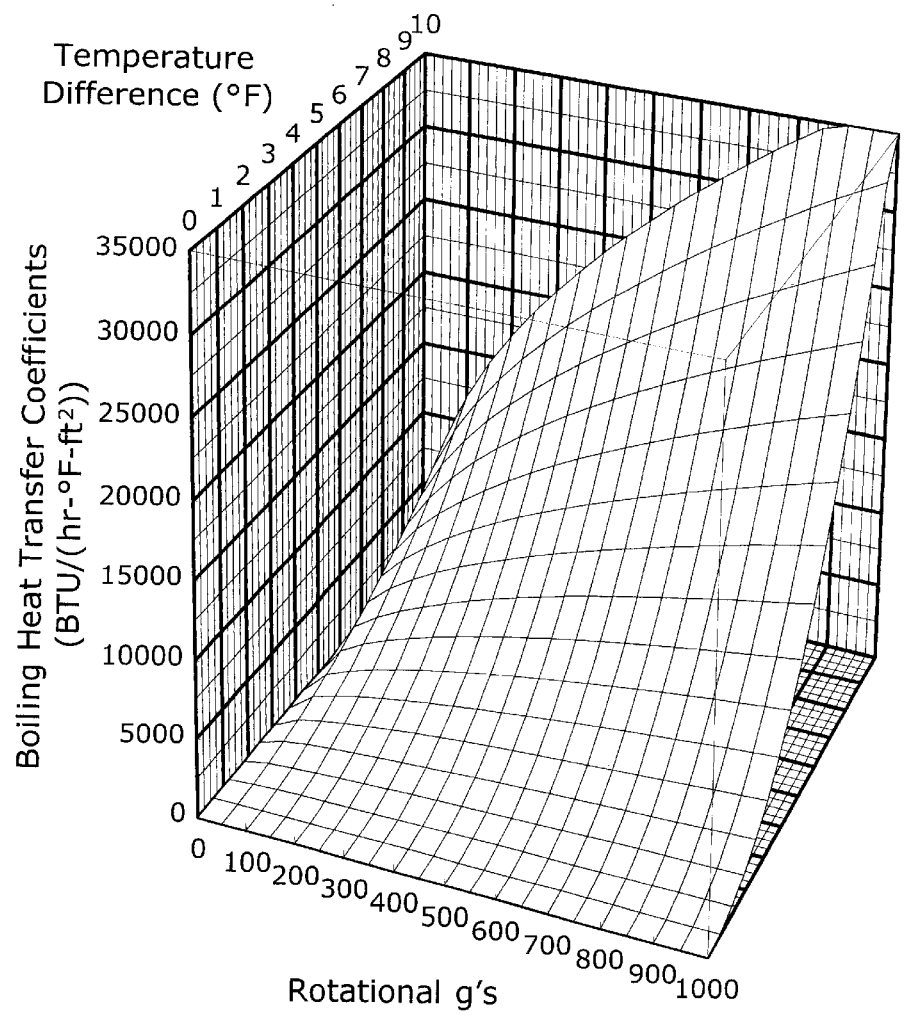
Figure 24:
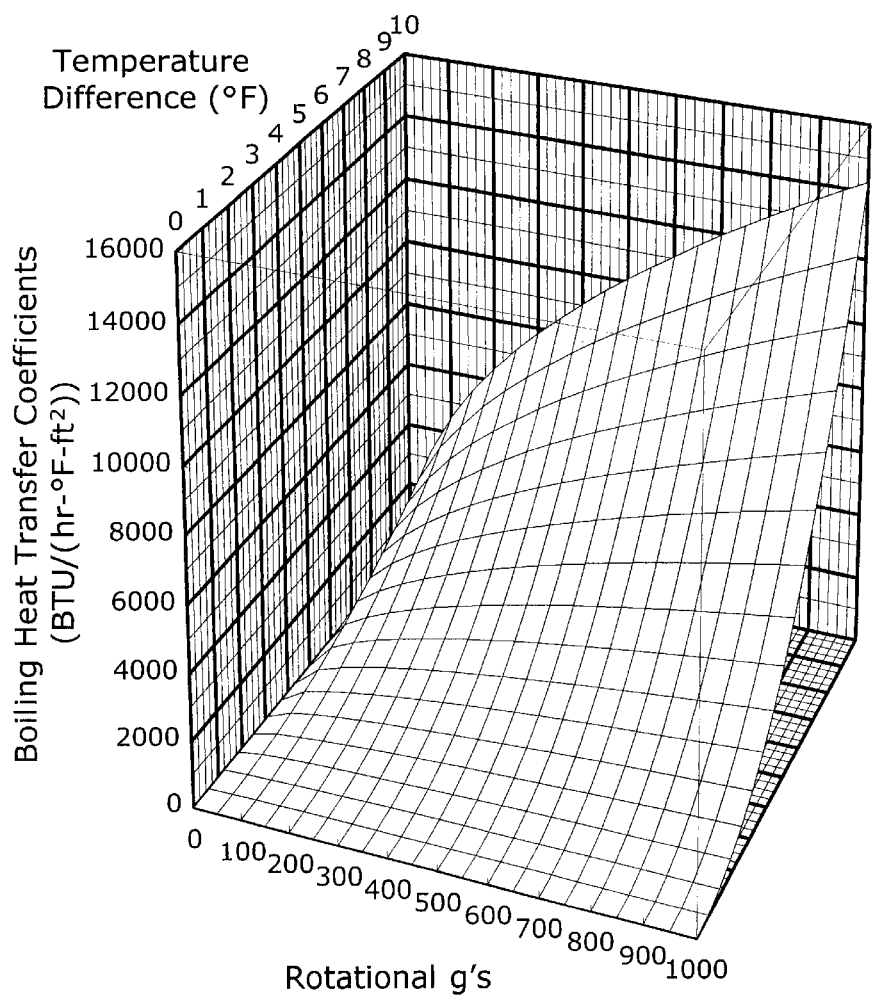

One acre-foot=1.23×10⁶ liters. In this expression $E_\rho^\lambda$ is the system energy density (FIG. 22) in Watt-hours per pound and $C_e$ is the cost of electrical power that the utility charges in cents per kilowatt-hour.

In other applications such as toxic waste separation at a chemical plant, the costs for water separation draw much higher revenue per weight of input than ordinary water desalination draws. For these special applications, small systems may be more cost-effective than larger ones. Smaller systems have lower capital system costs even though the power input increases.

Operational considerations are a function of the total operational economics. Factors include the users needs in volume flow rate per dollar power costs, user specified practical system size constraints and capital equipment costs.

The following analysis summarizes the theoretically predicted heat transfer performance values resulting from a small ΔT temperature difference between the boiler and condenser that is being transferred to a thin film in a high g rotational field. This application addressed the effects of this high g rotational field on heat transfer. These higher g configurations (up to or greater than 1000 g) provide much higher heat transfer coefficients. Consequently, the overall boiler surface area can be decreased considerably. This makes manufacturing procedures simpler and less expensive. Accordingly, the total number of shells and the overall weight of the system can be reduced. This yields higher heat transfer coefficients. The system achieves these advantages because of the higher rotational g loads on a thin film boiling fluid.

The general relation which describes the boiling heat transfer coefficient in both the pool and nucleate boiling regimes is based on work by Rohsenow (See, for instance, *Handbook of Applied Thermal Design*, Eric C. Guyer, Editor in Chief, McGraw Hill 1989, pp. 1–79). Guyer references the original work of Rohsenow performed in 1952 using correlated experimental data. The relation developed by Rohsenow has the following general form:

$$\frac{(q/A)}{\Delta T_{SAT}} \equiv h_B = \quad (33)$$

$$\mu_L \Delta h_{LG} (\Delta T_{SAT})^2 \left[\frac{g_N(\rho_L - \rho_G)/g_{grav}}{\sigma}\right]^{\frac{1}{2}} \left[\frac{C_{PL}}{C_{SF} \Delta h_{LG} P_{RL}^S}\right]^3$$

where the variables are defined as below with typical ranges for numerical values presented at ambient input temperatures of 70° F.:

$h_B$=Boiling heat transfer coefficient (150 to 15,000 (BTU/(hr ft² ° F.))

$\mu_L$=Fluid Dynamic Viscosity (2.33 (lb/(hr ft)))

$\Delta h_{LG}$=Heat of Vaporization Water (1054.3 (BTU/lb))

$\Delta T_{SAT}$=Saturation Temperature Difference (2 to 10 (° F.))

$$g_N = C_N DN^2 = \quad (34)$$

$$\frac{1}{2}\left(\frac{\pi}{30}\right)^2 DN^2 = \text{Rotational Acceleration } (64 \text{ to } 32{,}200 \text{ (ft/sec}^2))$$

D=Shell Diameter (0.5 to 5 (ft))
N=Rotational Speed (50 to 2500 (rpm))
$\rho_L$=Fluid Weight Density (62.3 (lb/ft³))
$\rho_G$=Vapor Weight Density (1.15×10⁻³ (lb/ft³))
$g_{grav}$=Weight to Mass Conversion (32.2 (ft/sec²))
$\mathcal{V}$=Surface Tension at Liquid Vapor Interface (4.97×10⁻³ (lb/ft))
$C_{PL}$=Specific Heat Fluid (0.998 (BTU/(lb ° F.))
$C_{SF}$=Material Experimental Constant (0.0058 to 0.013 (No Units))

$$P_{RL} = \left(\frac{C_{PL}\mu_L}{k_L}\right) = \text{Prandtl Number of Fluid (6.64 (No Units))}$$

S=Exponent Constant (1.0 for Water & 1.7 All Other Fluids (No Units))

Equation (33) represents the expected boiling heat transfer coefficient assuming no forced flow mixing. Forced flow mixing typically increases boiling heat transfer rates by an order of magnitude when the driving ΔT is below 15° F. (8° C.). See, e.g., McAdams, W. H., *Heat Transmission*, McGraw Hill, 3d Ed., 1954, p. 378. The fluid film migrates along the boiler surface (with a vertical component of gravity depending upon shell orientation). The fluid also has enhanced movement due to increased longitudinal pressures that rotational forces induce. This mixed mode of heat transfer enhances the boiling heat transfer rates even more than equation (33) alone predicts.

Results of Boiling Heat Transfer Calculations: FIGS. 19–24 show a series of computations of the general trends, which occur with rotational g's on boiling heat transfer rates. These figures are both three-dimensional surface renditions and two-dimensional slice plots for two different boiler surface material conditions and three different ambient input temperatures. Some of the figures show the enhanced boiler heat transfer behavior with increased rotational g for a roughly coated Teflon® PTFE surface on a stainless steel shell at ambient input temperatures of 70° F., 90° F., and 110° F. This series employs a material characteristic coefficient that was empirically determined to be CSF=0.0058 for a rough Teflon coat on stainless steel. See, *Guyer*, pp. 1–79. When using rough Teflon coated stainless steel instead of polished stainless steel, a 262% increase in boiling heat transfer occurs. The second series shows similar results for a different boiler surface, namely polished stainless steel only. Here, the characteristic surface coefficient is CSF=0.0080. Physically, the performance is reduced for polished stainless steel compared to a rough surface coated Teflon on stainless steel because the roughened Teflon surface provides more locations for nucleate boiling sites. Surface wetting characteristics increase with the Teflon coating.

Observe that as the ambient temperature increases, the boiling heat transfer coefficient increases for the same temperature differences and same rotational g's. Physically, this occurs because the heat of vaporization reduces with increasing temperature. Therefore, more heat energy is transferred to a boiling fluid for the same ΔT.

The graphs show some advantage for operating the system at increased input ambient temperatures. This requires heating the incoming contaminated liquid, which costs energy. Of course, if the contaminated liquid comes directly from an industrial process, it may be at an elevated temperature. At higher temperatures, the system could employ an additional external set of heat exchangers to recover some of the increased enthalpy carried out with the pure water and waste brine. This approach may be beneficial for certain applications where very small size capital equipment is required and energy costs are less important.

Enhancing Boiling Heat Transfer Rates: One method or design enhancement aimed at increasing the boiling heat transfer is to increase the surface roughness of the boiler wall. An example would be to provide minute "grain-like" thin Teflon® coatings on the boiling surfaces. This provides a great multitude of nucleate source points on a material, which is normally a non-wetting surface. This enhances the formation of steam bubbles that immediately rises radially out of the film layer from high surface pressure induced g-forces. These high g forces provide a higher buoyancy force for the micro steam bubbles in the high g field and create increased micro convective currents. Achieving these higher induced heat transfer coefficients is not possible with stationary systems in a 1-g environment. Several sources in the literature show that the affect of a wettable coating alone increases the heat transfer coefficient by up to 300%. See, Kreith, F., *Principles of Heat Transfer*, International Textbook Co., 2d Ed., 1968, pp. 441–445; and Guyer, pp. 1–79.

Using anodized aluminum with a Teflon coating on the boiler is another possibility. First, aluminum reduces the tangential hoop stress in proportion to the ratio of material densities, and the density of aluminum is about ⅓ that of stainless steel. Consequently, the tangential stress decreases from 7600 psi at 850 g's to about 2525 psi for corrosion resistant aluminum. Aluminum also has very high thermal conductivity compared to stainless steel. Aluminum has a thermal conductivity of about 120 (BTU/(hr ft °F.)) compared to stainless which has a value of about 10 (BTU/(hr ft °F.)). The importance of high thermal conductivity in the wall material becomes greater when the heat transfer coefficients due to boiling and condensing become less of a limiting mechanism.

High vapor velocities (50 to several hundred feet per second) exiting the individual boiler and condenser shells enhance the boiler heat transfer structures. Sweeping contaminated fluid along the boiler wall surface is the mechanism for this enhancement. The sweeping of liquid creates turbulence, which aids in forced convection heat transfer at the vapor fluid interface.

Forced convection through gravity-induced high pressure injection of brine or contaminated liquid also enhances boiler heat transfer conditions. Fluid moving along the boiler wall surface removes stagnant regions and, thus, greatly enhances forced convection heat transfer characteristics. The annular boiler passage area of the system can be modified to achieve favorable vapor velocity with forced convection enhancement along the axial direction. Longitudinal segment dividers placed between both the boiler and condenser shell passage areas at various azimuth locations also may enhance nucleate boiling by convective mechanisms on the boiler surfaces and should enhance drop-wise condensation on the condenser surfaces.

Condensing Heat Transfer Coefficients and Enhancements: Condensing heat transfer coefficients are usually higher than boiling heat transfer coefficients. Consequently, condensers require smaller surface area than boilers. According to Guyer, typical values for film condensation of pure steam range from 1000 to 5000 (BTU/(hr ft$^2$ °F.)) and for drop-wise condensation of pure steam, the values range from 10,000 to 50,000 (BTU/(hr ft$^2$ °F.)). Unfortunately, conventional condensing heat exchangers do not achieve drop-wise condensation except under very special conditions and only over reduced portions of the condensing surface. Failure to remove the condensate causes the failure to achieve drop-wise condensation. The condensate forms a film layer on the surface, which insulates the surface from the higher temperature vapor.

Collier, J. G., *Convective Boiling and Condensation*, McGraw Hill 2d Ed., 1981, pp. 366–369, describes three different methods for enhancing condensing heat transfer coefficients. First, by reducing surface tension forces of the condensate, changes to the surface geometry can increase the available area for condensation or promote more rapid removal of condensate. Next, treatment of the condensing surface can promote drop-wise rather than film-wise condensation. Making the surface non-wetting reduces surface tension forces. Three methods have been used, a) chemically coated surfaces which act as promoters, b) polymer-coated, non-wetting surfaces like Teflon®, and c) electro-plated surfaces use coatings of the noble metals to promote non-wettability. Last, force fields can remove the condensate from the surface effectively thereby leaving a "virgin" spot for enhanced heat transfer of the remaining vapor.

To enhance the condensate heat transfer coefficients further, vapor flow should not shear with the condenser surface. Otherwise, it is possible for surface filming to build up. See, e.g., Singer, R. M. and Preckshot, G. W., *The Condensation of Vapor on a Rotating Horizontal Cylinder*, Proceedings of the 1963 Heat Transfer and Fluid Mechanics Institute, June 1963. To help eliminate the differing relative velocities of the vapor condenser interface, it may be feasible to insert longitudinal plastic tube separators inside the condenser chambers. These tubes act to compartmentalize the vapor flow into channels and to impart a tangential velocity on the condensate fluid. These compartments help impart angular momentum to the condensate so that the g forces immediately remove the condensates from the condenser surface.

In addition, reducing the relative velocity between vapor and condensate minimizes the aerodynamic drag forces acting on the condensate. The interfacial shearing between the condensate and the condenser surface is eliminated if there is a rigid member to accelerate the condensate. In this case, the condensate accelerates to the point where its centrifugal force is much greater than the surface tension forces. Consequently, the condensate is removed immediately in a drop-wise fashion. Based on the empirical relation developed by Singer and Preckshot, heat transfer rates of 5000 to 15,000 (BTU/(hr ft$^2$ °F.)) can be reached at moderately low rotational velocities.

Putting horizontal (axial) scratches on the condenser surface also may increase the condenser heat transfer coefficient. Adding scratches when unrolling of the boiler sheet material during fabrication is feasible. The scratches reduce the contact surface wetting area for the condensate droplets. Consequently, droplets do not adhere to each other on the condenser surface during high g rotation. This technique may reduce the build-up of surface tension forces on a condensing film so that g forces immediately overcome the surface tension. Accordingly, this method may promote a very high degree of drop-wise condensation, which yields exceedingly high condenser heat transfer coefficients that stationary systems cannot achieve.

As previously mentioned, longitudinal segment dividers between both the boiler and condenser shell passages can enhance drop-wise condensation. The dividers impart a continuous angular momentum to the fluid condensate. The momentum accelerates the condensate drops until they overcome surface tension forces so that the condensate is thrown away from the condenser surface. The segment dividers also add structural rigidity to the overall shell assembly.

Segment dividers could be made of flexible plastic tubing plugged on each end and filled with a dense gas or light fluid by hypodermic needle through a rubber policeman fitting. The dividers would not move azimuthally due to pressure expansion between shells and since radial g forces hold them against the adjacent outer shell.

Figure 25:
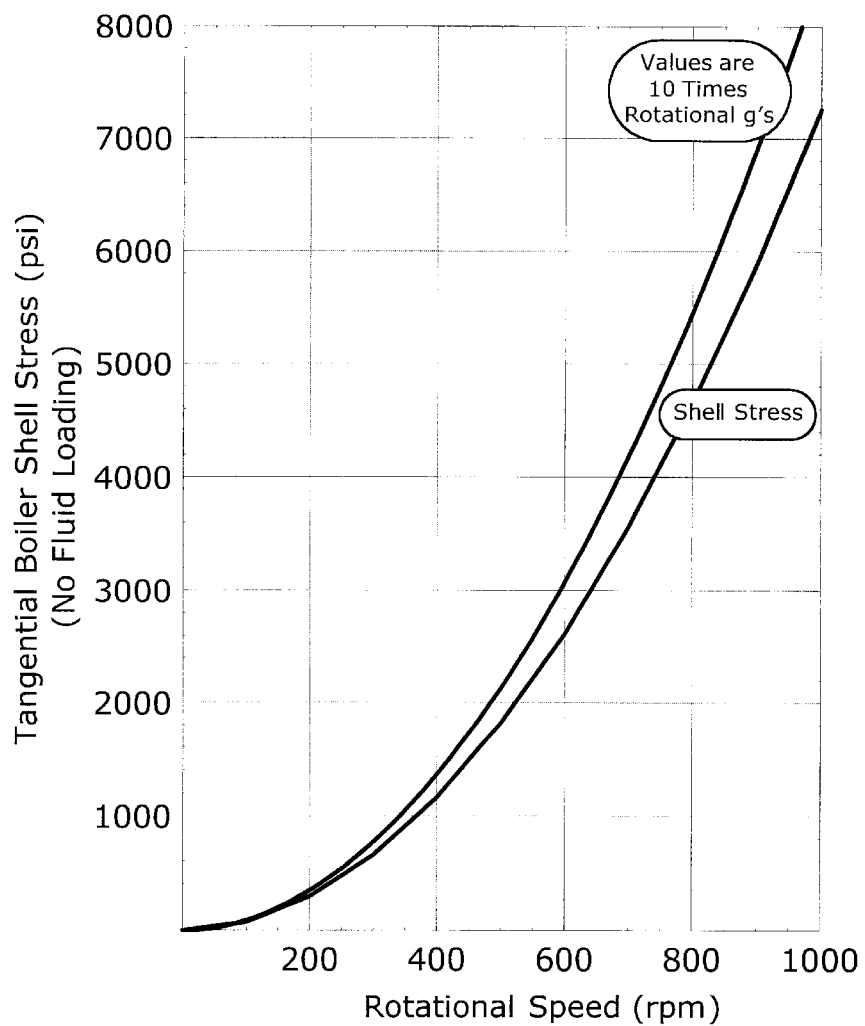
FIG. 25 is a graph of predicted tangential stress (in psi) at various rotational speeds on the outer shell of an exemplary embodiment of the present invention assuming no fluid load, a 5 ft (1.5 m) diameter and a 0.015 in (0.38 mm) wall thickness of stainless steel.
Figure 26:
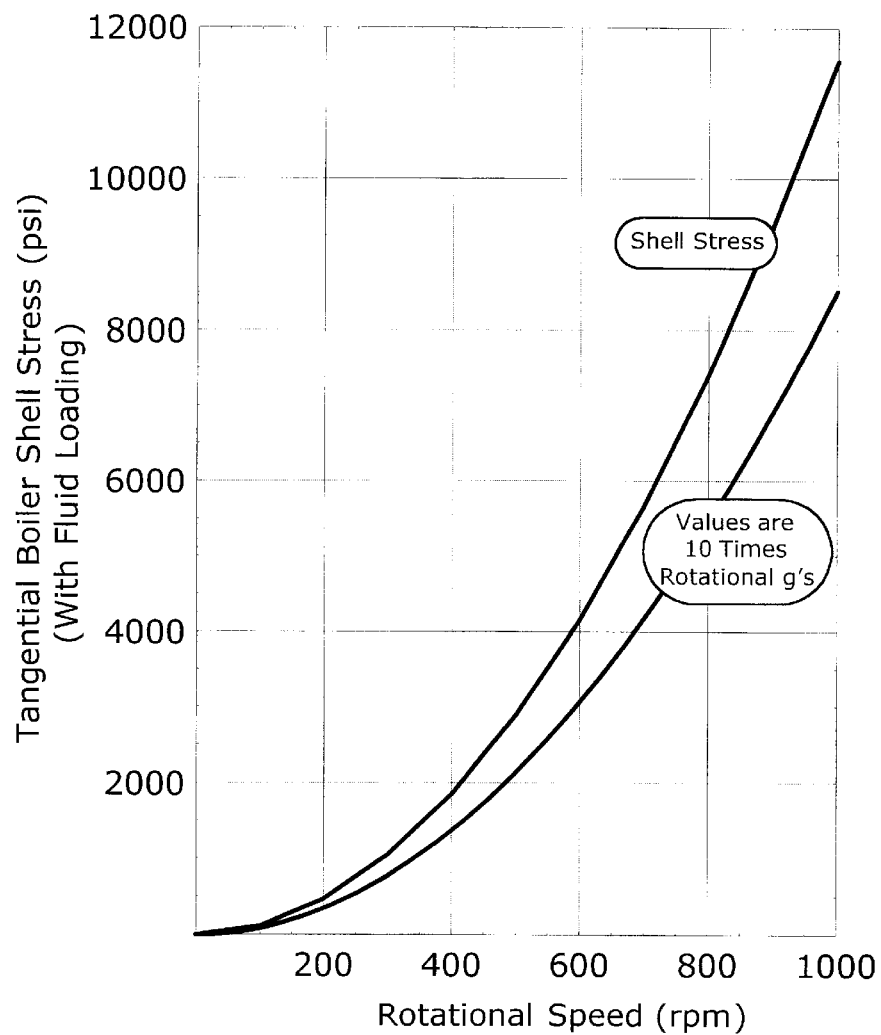
FIG. 26 is a similar graph to FIG. 25, but the predicted tangential stress is for the same size shell loaded with a 0.07 in (1.8 mm) water thickness.

Boiler Shell Stress and Strain—Overview: High velocity rotation induces shell stresses from the shells' own weight and from the weight of the rotating fluid against the shells. Calculations show that typical stress values are very low (7.5 ksi to 12 ksi) even up to 1000 g's. Summary graphs of FIGS. 25 and 26 plot the rotational pressure variation exerted against the shells from the weight of the fluid for different liquid film thickness. These pressures are used to compute the total stress against the shell.

Applicants expect that film thickness values typically will be below 0.015 inches (0.38 mm) at high g rotation rates. Film thickness depends upon rotation rate, fluid injection rates and the height of any boiler dam closing off the end of the boiling chambers. Rotational g forces naturally thin the fluid film, and the highest heat transfer rates probably occur when the film is maintained at the thinnest values. Of course, total coverage across the boiler surface must be achieved. For desalination applications, an increase in waste brine output is not a problem.

Accordingly, fluid injection rates should maximize the pure water output for any given compressor power condition. Too little filming may create dry spots and thus reduce pure water output. Too much filming may reduce heat transfer rates and reduce the pure water output flow. The microprocessor feedback control loop can automatically adjust the conditions. With proper design, the control loop can measure fluid injection rates at any given rotational g load to maximize pure water output.

FIGS. 25 and 26 show the calculated stress, strain and rotational g's on the outer boiler condenser ring for 5 ft (1.5 m) a shell diameter. The graphs show that the induced tangential stresses in the outer shell (inner shells have lower stresses) due to high rotational speeds are negligibly small compared with typical maximum acceptable stress for a 0.015 in. (0.38 mm) thick stainless steel shell. FIG. 26 shows that even with the additional load of the liquid film carried by the shell (assumed to be 0.070 in. (1.8 mm) thick-much thicker than expected), the maximum tangential stresses (which occur at the shell's inner surface) are still easily within design limitations. The radial growth of the shell is also very small with a maximum growth of only about 2 mils at the outer 5 ft diameter. See an example plot in FIG. 26.

Applicants investigated the required summed area for various numbers of shells at different spacings for a hypothetical 5 ft. diameter by 6 ft. long (1.5 m×1.8 m) system. The calculation determined expected weights of the boiler and condenser shells for these configurations. These weight charts shown represent half the total weight of shells in a module system. In an actual boiler/condenser chamber design, an additional separation shell between each boiler is required. Therefore, the total weight of all shells would be twice those values presented in the weight charts. Therefore, the weight charts to follow represent the summed weight for the boiler shells only.

With the expected enhanced heat transfer values resulting from higher g rotational rates, the overall surface area and weight requirements will decrease considerably from those initially projected. The total number of required shells for the same water product output flow will also decrease considerably. That reduces the manufacturing costs.

Figure 27:
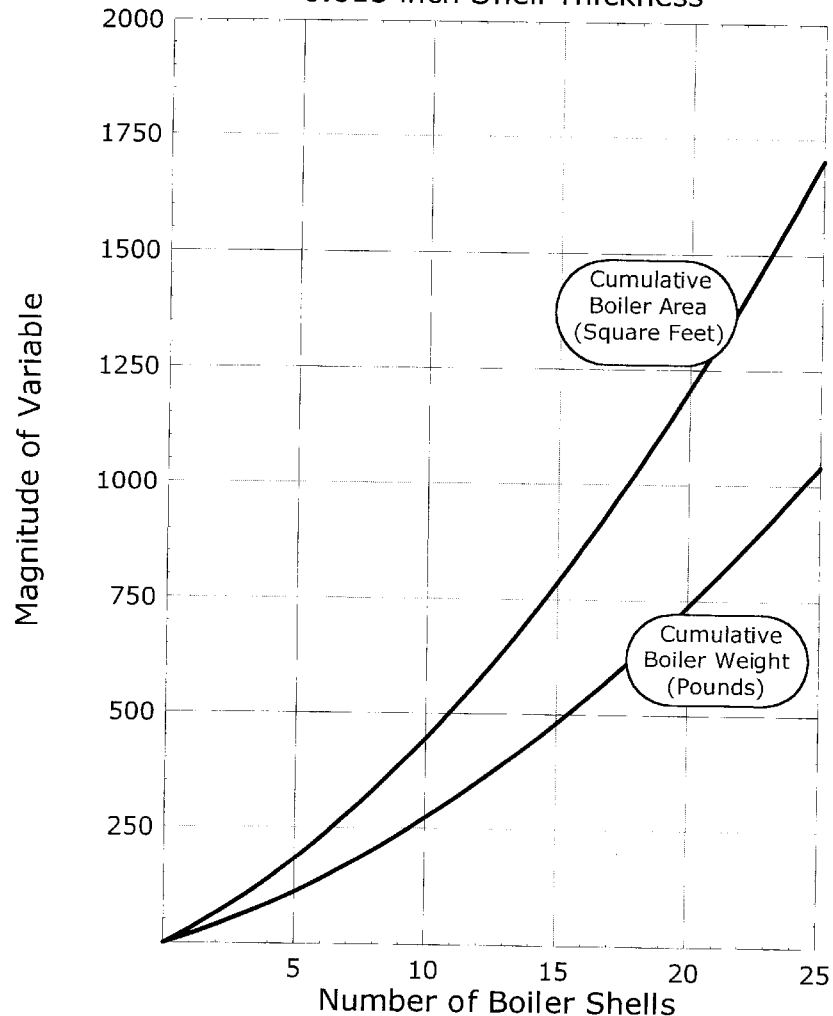
FIG. 27 is a graph showing how the cumulative boiler area varies as a function of the radius of the outer shell assuming given shell separation, inner shell radius, shell thickness and shell length.

A series of computations were performed to display what the integrated boiler surface area and weight is for various shell separations. See FIG. 27 for plots of the computed values. The inner radial shell is assumed to have the specified diameter and additional shells surround the inner shell with the indicated separations up to a maximum 5 ft. diameter as proposed for a possible demonstration module. The jagged lines on these series of plots indicate the effective radius (discretely computed) where the cumulated surface area below this radius is equal to the cumulated surface area above it. These curves provide a measure of the approximate diameter where a fixed heat transfer coefficient could be computed and applied at all shells. Since the heat transfer increases with g values, a value computed at the "effective diameter" gives conservative results for the entire system.

There are a number of features and attributes about the present system that make it superior to other processes and equipment, and they are summarized below.

| SYSTEM ATTRIBUTES | THE PRESENT SYSTEM | STANDARD DISTILLATION | REVERSE OSMOSIS |
| --- | --- | --- | --- |
| Capital Acquisition Costs | Low | High | Medium |
| Maintenance Costs | Low | Medium | High |
| Operational Costs | Low | Medium | High |
| Size Equip Requirements | Low | 25 × Present System | 2 × Present System |
| Equipment Size | Low | High | Medium |
| Energy Usage | Low | High | Medium |
| Self Cleaning | Automatic | Medium | Difficult |
| Handle High Total Dissolved Solids | Easy | Fair | Difficult |
| Bacteria, Metals, Ions | Pyrogen Free | Poor | Difficult |

We claim:
1. A boiler and condenser system comprising:
a) a housing;
b) at least three spaced-apart and generally concentric shells within the housing extending about an axis of rotation, the at least three shells comprising an inner shell closest the axis of rotation, and outer shell farthest from the axis of rotation and a middle shell between the inner shell and the outer shell, the shells forming two spaces, an inner space defining a boiler between the inner shell and the middle shell, and an outer space defining a condenser between the middle shell and the outer shell; each space having two ends;
c) rotation means for rotating the shells about the axis of rotation at an angular velocity sufficient to cause the fluid in the boiler to form a thin film along the middle shell;
d) a compressor having a lower pressure side and a higher pressure side, the lower pressure side communicating with the inner space and decreasing the pressure in the inner space, the higher pressure side communicating with the outer space:

e) a source of fluid; an injector operably connected to the source of fluid and to the inner space transmitting the fluid into the inner space;

f) an outlet from the outer space through which fluid can flow; and g) a collector in the housing into which fluid from the outlet collects.

2. The boiler and condenser system of claim 1 further comprising a tube connected to the source of fluid, a plurality of tubular members communicating with the tube and receiving fluid from the tube, at least a portion of each tubular member being adjacent the inner shell and middle shell, the injector being attached to the tubular member where the tubular member is adjacent the inner shell and middle shell.

3. The boiler and condenser system of claim 1 wherein the compressor is a fan, the fan rotating about the axis of rotation of the shells.

4. The boiler and condenser system of claim 3 wherein the at least three concentric shells each have two ends, the respective ends being aligned with each other in two planes, at least a portion of the fan is located between the two planes.

5. The boiler and condenser system of claim 3 further comprising a duct downstream from the fan.

6. An apparatus for purifying contaminated liquids comprising:

an outer chamber under less than ambient pressure;

an inner housing within the outer chamber having at least a first and a second generally concentric shells rotating about a common axis of rotation, a space between the first and second shells defining a boiler, each shell having an inlet end and an outlet end;

a contaminated liquid inlet extending from outside the outer chamber to the inlet end of the first shell, a compressor downstream from the outlet end of the first shell;

a clear path from the outlet end of the first shell to the compressor and from the compressor to the inlet end of the second shell;

a contaminant outlet downstream from the outlet end of the first shell and a purified liquid outlet downstream from the outlet end of the second shell; and wherein the shells rotate at an angular velocity sufficient to cause the liquid in the boiler to form a thin film along the second shell.

7. The apparatus of claim 6 wherein the outlet end of each shell has a larger diameter than the inlet end of the shell.

8. The apparatus of claim 6 wherein the outer chamber comprises a pair of hubs aligned with the axis of rotation, a shaft extending through each of the hubs, each shaft supporting a bearing, and each bearing supporting one end of the inner housing for rotating about the bearing.

9. The apparatus of claim 8 wherein each shaft is hollow, the contaminated liquid inlet comprising an inlet tube extending through one of the hollow shafts.

10. The apparatus of claim 9 further comprising branch tubes communicating with the inlet tube, the branch tubes having at least a portion adjacent the inlet end of the first shell, and at least one injector communicating with the branch tubes, the injector injecting contaminated liquid into the inlet end of the first shell.

11. The apparatus of claim 8 wherein the inlet ends of the shells are coplanar and the outlet ends of the shells are coplanar, the compressor comprising a fan mounted at the axis of rotation.

12. The apparatus of claim 11 wherein at least a portion of the fan is mounted adjacent the plane of the outlet ends of the shells.

13. The apparatus of claim 11 further comprising a duct about the axis of rotation and communicating with the fan.

14. The apparatus of claim 6 wherein the outer chamber comprises a pair of hubs aligned with the axis of rotation, a shaft extending through each of the hubs, the compressor comprising a fan mounted at the axis of rotation to one of the shafts.

15. The apparatus of claim 6 wherein the outer chamber comprises a pair of hubs aligned with the axis of rotation, a shaft extending through each of the hubs, the apparatus further comprising a first collector ring mounted adjacent the inlet end of the shells and having a diameter larger than the shell having the largest diameter, a stationary dip tube extending from the first collector ring to an outlet adjacent one of the shafts.

* * * * *